(12) United States Patent
Danico et al.

(10) Patent No.: US 8,756,083 B2
(45) Date of Patent: *Jun. 17, 2014

(54) SYSTEM AND METHOD FOR IDENTIFYING AND ASSESSING COMPARATIVE NEGLIGENCE IN INSURANCE CLAIMS

(75) Inventors: Angela G. Danico, North Reading, MA (US); Andre R. Heindenheim, Warwick, RI (US); Sarah E. Hopkins, Manchester, NH (US); James D. Murphy, Londonderry, NH (US); Soon Lim, Cranston, RI (US); Steven E. Shriner, West Greenwich, RI (US)

(73) Assignee: Metropolitan Property and Casualty Insurance Company, Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/009,458

(22) Filed: Jan. 19, 2011

(65) Prior Publication Data
US 2011/0196707 A1    Aug. 11, 2011

Related U.S. Application Data

(63) Continuation of application No. 10/214,868, filed on Aug. 7, 2002, now Pat. No. 7,885,829.

(51) Int. Cl.
*G06Q 40/00* (2012.01)
*G06Q 40/08* (2012.01)

(52) U.S. Cl.
CPC ..................... *G06Q 40/08* (2013.01)
USPC ............................................. 705/4

(58) Field of Classification Search
CPC ...................................... G06Q 40/08
USPC ............................................. 705/4
See application file for complete search history.

(56) References Cited

U.S. PATENT DOCUMENTS

2002/0069091 A1 * 6/2002 Wahlbin et al. ............ 705/4
2002/0138449 A1 * 9/2002 Kendall et al. ............. 705/75

OTHER PUBLICATIONS

Feigeason, Neal et al. Effect of blameworthiness and outcome severity on attributions of responsibility and damage awards in comparative negligence cases. Law and Human Behavior, vol. 21(6), 1997, pp. 597-617.*
White, Michelle J. An empirical test of the comparative and contributory negligence rules in accident law. The RAND Journal of Economics, vol. 20(3), 1989, pp. 308-330.*
Cummins, David J., et al. The incentive effects of no. fault automobile insurance. Financial Institutions Center, the Wharton School, University of Pennsylvania, Aug. 16, 1999.*

* cited by examiner

*Primary Examiner* — Sheetal R Rangrej
(74) *Attorney, Agent, or Firm* — Troutman Sanders LLP.

(57) ABSTRACT

The invention is a method and system useful in determining the degree of comparative negligence of an insured person involved in an accident as compared to the comparable negligence of other parties involved in the accident, in particular the insurance claimant. The method and system of the invention include, at a minimum, the steps of gathering preliminary information concerning accident type, applying preliminary rules to the preliminary information to determine accident type, gathering additional information specific to the accident type, and applying accident-type-specific rules to the additional information to determine the degree comparative negligence of said insured person and/or the claimant.

20 Claims, 16 Drawing Sheets

FIG. 2

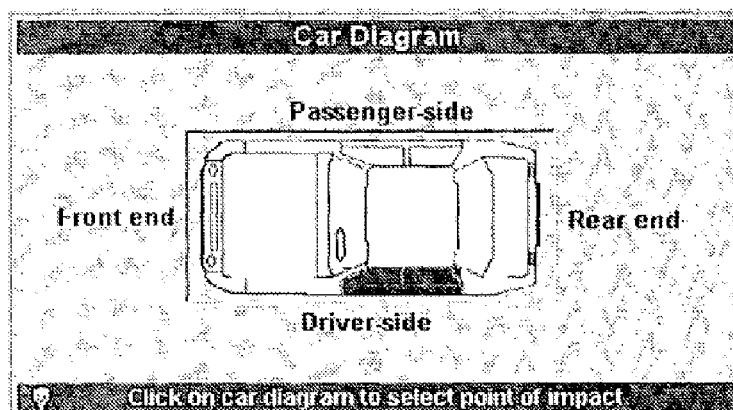
FIG. 8
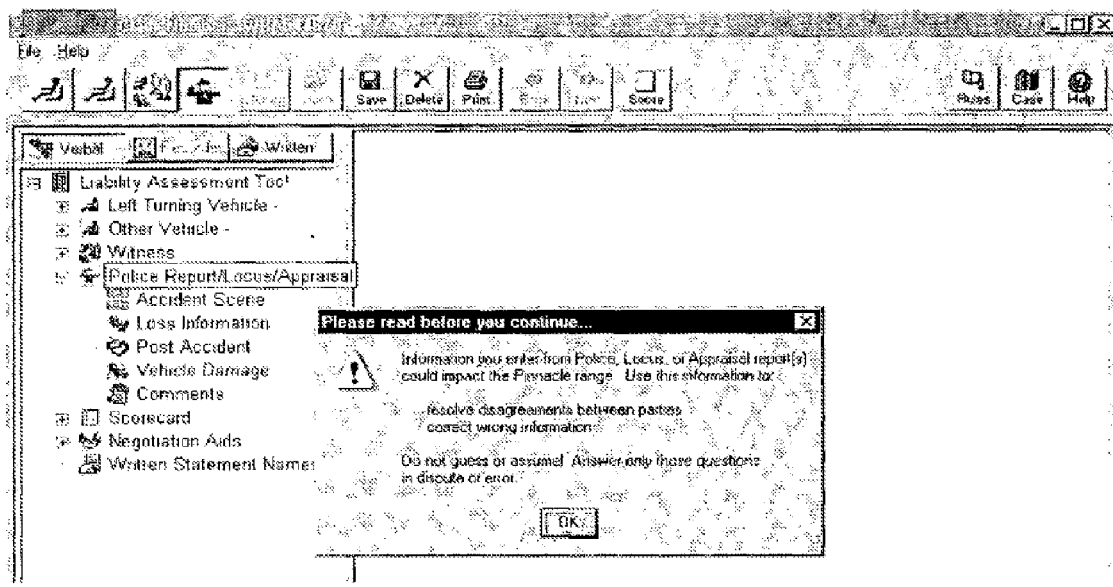
FIG. 9

| Claim Type: | ○ First Party  ⦿ Third Party | |
|---|---|---|
| Current Offer: ___% Date: 06/20/2002 | Settlement was reached by: | |
| Agreed Settlement: ___% Date: 06/20/2002 | ○ Agreement 3rd party direct | |
| ☐ Denial/No PDL Offer made  Date: 06/20/2002 | ○ Agreement with 3rd party carrier | |
| ☐ Void/Take Out of Region  Date: 06/20/2002 | ○ Arbitration award | |
| ☐ Settled based on BAILMENT | ○ Small claims/Suit | |

Fig. 12

Welcome to Pinnacle Reporting

File  Help

Set Criteria | Summary Results | Detail Results

Please Select Report Criteria

Select Data:
⦿ MetLife  ○ St. Paul

Pinnacle Report:

Field Claim Offices:
- ALL Field Claim Offices
- Albany
- Bloomington
- Charlotte
- Cross Point
- Dallas
- Freeport
- Indianapolis
- Naperville
- Rocky Hill
- Aurora
- Seattle States:
- All States
- Alabama
- Alaska
- Arizona
- Arkansas
- California
- Colorado
- Connecticut
- Delaware
- District of Columbia
- Florida
- Georgia
- Hawaii
- Idaho
- Illinois
- Indiana
- Iowa
- Kansas
- Kentucky
- Louisiana Additional Selections:
☐ Desk Location  ☐ Claim Number Report Dates:
From 01/01/2002  To 06/20/2002

Fig. 13

SYSTEM AND METHOD FOR IDENTIFYING AND ASSESSING COMPARATIVE NEGLIGENCE IN INSURANCE CLAIMS

BACKGROUND OF THE INVENTION

This application claims priority to application Ser. No. 10/214,868 filed Aug. 7, 2002 which is incorporated by reference herein.

The practice of investigating and assessing liability in automobile accidents no doubt dates back to the invention of the automobile. Over the years, the number and dollar value of insured automobile accident losses have greatly increased—the result of increased automobile usage, automobile values, and driving speeds. Similarly, the tort law concept of negligence, rooted in the English Common law and dating back many centuries, has also evolved, with the concept of strict contributory negligence giving way to theories of comparable or comparative negligence.

Comparative negligence describes the concept that a claimant's negligence, which to along with an insured's negligence causes the claimant's injury, diminishes the damages that the claimant is entitled to recover. Comparative negligence includes any rule under which the relative degree of negligence of the parties is considered in determining whether, and to what degree, either should be held responsible for a loss. The doctrine of comparative negligence is designed to eliminate the "all or nothing" effect of common law contributory negligence rules (by which any amount of negligence "contributed" by the claimant would bar his or her bars recovery).

Comparative negligence rules have developed into three major categories used by the majority of states within the United States, and a number of nations and territories throughout the world: "pure" or "100 percent" comparative negligence rules, "modified" comparative negligence rules, and "slight-gross" comparative negligence rules.

Pure comparative negligence allows a claimant whose negligence is not the sole proximate cause of his injury to recover despite his own negligence, but requires that the amount of his damages be decreased in proportion to the degree of his negligence. Under the pure type of comparative negligence a claimant's recovery is not barred even though his contributory negligence was equal to or greater than the defendant's negligence. (For instance, a plaintiff who is 99% negligent may recover 1% of his damages.) Pure comparative negligence has no application where the negligence of the claimant was the sole proximate cause of the injury, or where the sole proximate cause of the accident was the claimant's negligence.

Under "modified" or "50 percent" comparative negligence, a claimant's contributory negligence is not a bar to recovery if his negligence was not as great as the negligence of the defendant. As with pure comparative negligence, the damages suffered by the claimant are to be reduced by the degree of his or her negligence. For example, a claimant chargeable with 49 percent of the combined negligence resulting in his injury may recover 51 percent of his damages against a party responsible for 51 percent of such negligence, but if the proportion of negligence chargeable to the claimant is 50 percent or more he cannot recover anything.

Under the "slight-gross" rule of comparative negligence, a claimant may recover a proportionate share of his damages where his negligence is not greater than that of the other party. Thus a claimant who is equally negligent with the other party can recover 50 percent of his damages.

There are no hard and fast rules for assessing the relative negligence of the parties to a loss. Such assessments depend on the precise circumstances of each particular case. In certain situations one may consider the comparative knowledge of the parties as to the existence of facts or circumstances creating a hazard. For example, if a party had notice of a hazard, consideration should also be given to whatever precautions that party took for his or her own safety, the extent to which he or she should have appreciated the risk as a result of warnings, experience, or other factors, and the foreseeability of injury as a consequence of his or her conduct. One may also take into account unusual and peculiar circumstances, which create a greater risk. Recognizing these and other concepts and consistently applying them to the facts surrounding a particular accident, however, remains difficult for even the most experienced investigator.

Today's insurance claim investigator must handle a large number of claims. For each claim, the investigator must perform the difficult and time-consuming task of gathering large amounts of information from a variety of sources, including information from the insured, the claimant and any witnesses and police reports. The investigator must then evaluate each claim based on his or her understanding of the relevant legal concepts, and in particular concepts of comparative negligence. Individual claims must be processed fairly and consistently with other claims resulting from like circumstances.

In the past, the components of an investigator's investigation were more often than not "buried" in various locations, for instance in paper files, in computer notes, on audio tapes, etc. This would make the process of locating evidence, comparing statements, and recalling what was said very difficult and time consuming. Without a central repository for the investigation and subsequent negotiations, key elements might be overlooked, depending on the complexity of the claim and independent expertise of the claims adjuster investigating the claim. Another unfortunate result might be that similar to accidents handled by different investigators, or even the same investigator on a different day, result in different assessments. Until now there has been no truly uniform method of assessing comparative negligence, either from claim to claim or from investigator to investigator.

OBJECTS OF THE INVENTION

It is an object of the present invention to provide a method and system for consistently and accurately identifying and assessing comparative negligence in insurance claims that overcome shortcomings of the prior art, namely, the slow and complex nature of insurance claim processing.

It is another object of this invention to provide a method and system for resolving inconsistencies in accident details related to the insurance investigator by the various parties having knowledge of an accident.

It is a further object of the invention to provide a system for identifying and assessing comparative negligence wherein the insured, the claimant, and witnesses are asked a standardized series of questions, and wherein the responses to the questions are uniformly analyzed according to business rules.

Various other objects of the present invention will become readily apparent from the ensuing detailed description and from the accompanying figures and drawings.

SUMMARY OF THE INVENTION

The present invention is a computer-based method and system (collectively, "system"), for identifying and assessing comparative negligence in insurance claims. The system allows an insurance investigator to efficiently and consistently take into account recognized legal concepts to determine comparative negligence with respect to an insurance claim. Such concepts can include but not limited to determining whether a legal duty is owed to the claimant by the insured, whether the insured breached a legal duty owed to the claimant, and whether any such breach is the proximate cause of the accident.

More specifically, the present invention provides a system for calculating a number value for comparative negligence of one or more parties to an accident based on answers to a plurality of questions relating to the accident which is the subject of an insurance claim, as these answers are processed based on one or more pre-determined business rules. Preferably, the present invention defines these business rules in simple logical English or formulas, such as "if the weather affected visibility (i.e., raining) and the insured admits that wipers were not on, then add 1% to insured liability". The present invention allows the insurance investigator to use a uniform system of data collection and analysis to determine degrees of comparative fault in automobile accidents.

Upon receiving a claim, in accordance with an embodiment of the present invention, the investigator employs the inventive system to initiate a liability investigation by posing, typically to each party involved in the accident (i.e., the claimant, the insured, and any witnesses), a series of questions generated by the system. Alternatively, each party can access the inventive system over a communication network, such as, the corporate network, the Internet, and answer the question on-line on the web-site, insurance company's or insurance agent's web-site. The series of questions seek basic facts relating to the genesis of the claim, including the identity of the parties involved in the accident, the location of the accident, the positions of the respective vehicles before, during and after the accident, the existence or nonexistence of traffic signals and/or signs, and the type and configuration of the roads on which the accident occurred. Responses to these questions are stored, creating a data set. The system can supplement this data set with a police report, if one exists, and the investigator's own assessment of the automobile(s) involved in the accident.

The system then analyzes the data according to a set of business rules to determine the "accident type". Accident types might include "left turn", "pulling out straight," "right turn", "traffic light," "merging/lane change," "backing" or any other similar general accident category. Where the data are inconsistent or contradictory (for instance, where claimant and the insured disagree as to whether a traffic light controlled the intersection), the system alerts the adjuster or operator that there is a disagreement over the basic accident type. The first caller to answer the set of questions determines the accident type used to assess the loss/claim. However, the adjuster can re-set the accident type if it is determined that the wrong accident or loss type was selected, e.g., the adjuster can delete and re-enter the interviews.

After the system determines the accident type, a more detailed series of questions, tailored to the determined accident-type, is posed to each of the parties. For each accident type, the system generates a list of mandatory questions that must be answered in order to generate a liability assessment. For instance, where the accident type is determined to be "left turn", there are a finite number of questions pertaining to left turn accidents that should be addressed to make a liability assessment. These can include questions necessary to form a "mental picture" of the way the cars came together, who may have had a superior right of way and where each car hit the other. The questions are formulated to ensure that at least minimal, necessary information is collected. Preferably, the system also generates other non-mandatory questions to better assess degree of negligence. In accordance with an embodiment of the present invention, the system generates a plurality of questions for each accident type, and provides a limited number of possible responses for each question, such as multiple choice questions. The system stores the answer to each question for further analysis.

Although different questions may be posed depending on accident type, and although the invention is not limited to any particular series of questions, the following list typifies the types of information sought:

1. Point of impact between insured's and claimant's vehicles
2. Lines of sight between the insured and the claimant, including:
   whether there was sun glare
   whether wipers were on
   when each party first saw the other vehicle
   the distance between vehicles at key times
   the direction of travel of each vehicle in relation to the other
   use/non-use of headlights, lighting conditions
   presence/absence of distractions
3. Speed of each vehicle, including:
   absolute speeds of the vehicles, and speeds relative to speed limit and driving conditions
   presence/absence of skid marks
4. Evasive actions taken or not taken, including:
   swerving
   passing
   slowing/stopping
   accelerating
5. Compliance with traffic regulations, including:
   signage
   whether traffic citations (or warnings) were issued The additional gathered information is then analyzed according to a second set of business rules. As with the rules used to determine accident type, the second rule set includes rules for deciding between inconsistent and/or contradictory answers. Generally, when there is a witness, the system uses witness' response to resolve any contradictory responses from the insured and claimant. When there is no witness, the system uses the answers of the party who would have the best idea of the truth (e.g., each party knows best what he/she was doing, where he/she was, etc.). Preferably, the system supplements or corrects the answers of any of the parties with the information contained in a police report, scene locus (e.g., accident photos, diagrams of accident site, etc.) and/or vehicle appraisal.

Generally, a "baseline" liability score is computed based on the point of impact, since that one factor is typically the most important one in determining comparative liability. (Point of impact incorporates data such as the location of damage on each vehicle, the orientation of each vehicle to the other, the direction of movement of each vehicle, whether any swerving occurred, etc.) The point of impact baseline score corresponds to a value between 0 and 100%, reflecting an initial assessment of the degree of negligence of either party.

Percentage points are then added or subtracted from the baseline liability score depending on the application of the business rules analyzing the responses of the parties to the accident-type-specific questions relating, generally, to line of sight, speed, evasive actions, traffic citations, or other similar categories relating to the facts of the accident.

BRIEF DESCRIPTION OF THE DRAWINGS

The following detailed description, given by way of example, and not intended to limit the present invention solely thereto, will be best be understood in conjunction with the accompanying drawings:

FIG. 2 is a screen shot of the initial screening phase of the system in accordance with an embodiment of the present invention;

FIGS. 6-8 are exemplary screen shots of various accident specific questions in accordance with an embodiment of the present invention;

FIG. 9 is an exemplary screen shot of the notification screen informing the user or interviewer to use police report to resolve any disagreement between the parties in accordance with an embodiment of the present invention;

FIG. 12 is an exemplary screen shot of the settlement information screen in accordance of the embodiment of the present invention;

FIG. 13 is an exemplary screen shot of the initial reporting screen in accordance with an embodiment of the present invention;

DETAILED DESCRIPTION OF THE EMBODIMENTS

Experience has shown that the conduct of a proper investigation in its context of an automobile accident insurance claim involves the evaluation of certain facts relevant to the negligence of the parties involved. These facts center on the physical circumstances of the accident being investigated, and include the initial point of impact between vehicles, the lines of sight of the parties (including when and where each party saw the other), the speed of the vehicles at the time of the accident, evasive actions taken by the drivers, road/weather conditions, whether the police issued warnings or citations to one or more of the parties, and similar facts. This information, typically obtained from a variety of sources, is frequently inconsistent or contradictory. This difficulty is to be expected given the competing motivations of the insured and the claimant. Alternatively, the parties access the software via internet and answer the questions on-line.

The present invention provides a method and system for gathering and processing such information that is readily implemented using presently available communication apparatuses and electronic components. The invention finds ready application in virtually all communications system, including but not limited to the intranet, local area network (LAN), wide area network (WAN), Internet, private or public communication networks, wireless networks, satellite networks, cable networks or other online global broadcast networks.

Figure 1:
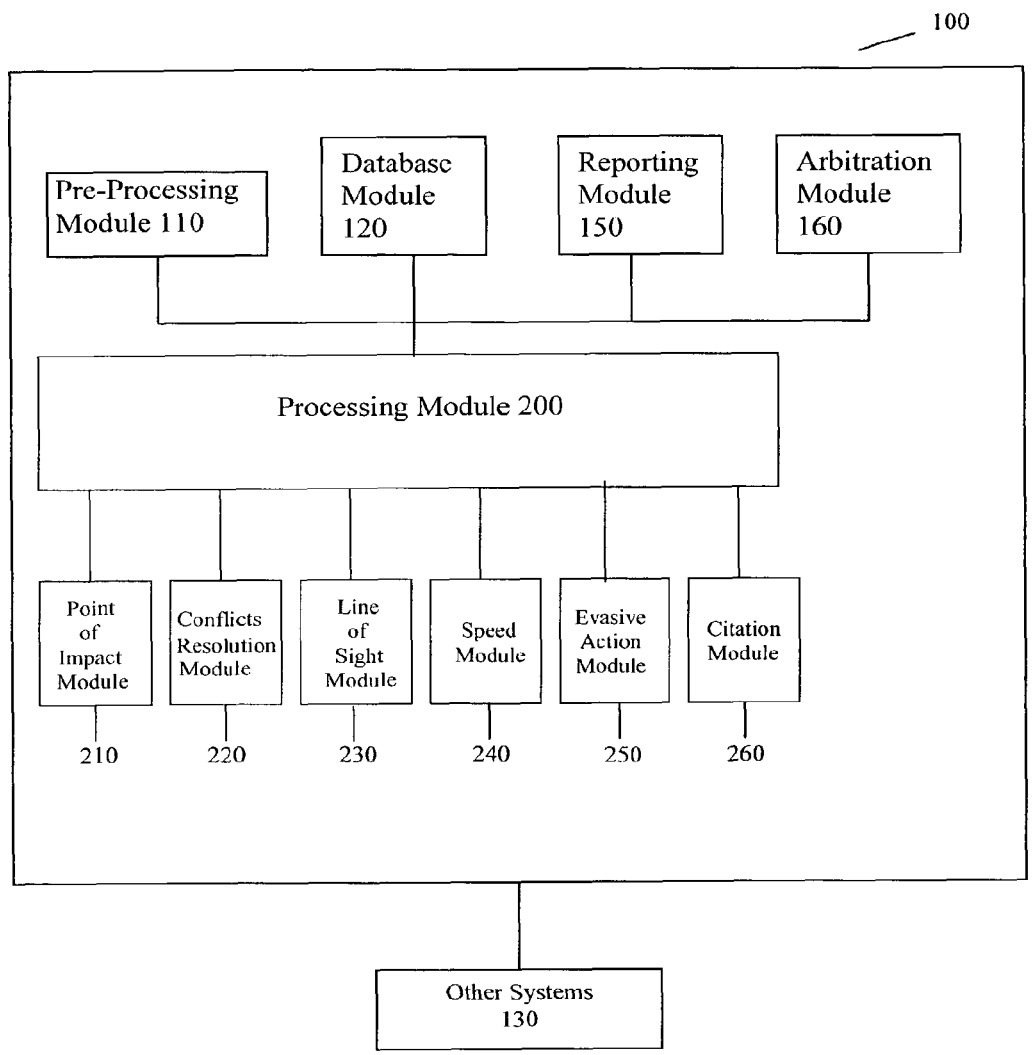
FIG. 1 is a block diagram of the inventive system in accordance with an embodiment of the present invention.

Turning now to FIG. 1, there is illustrated a system 100 for identifying and assessing comparative negligence in insurance claims in accordance with an embodiment of the present invention. The system 100 comprises a pre-processing routine or module 110 for generating preliminary questions to classify the claim (i.e., accident or loss) into a particular category, a processing routine or module 200 for assessing comparative negligence of a particular insurance claim, and a central repository or database 120. The processing module 200 further comprises a point of impact routine or module 210, a conflict resolution module 220, a line of sight routine or module 230, a speed routine or module 240, an evasive actions routine or module 250, and a citations routine or module 260. The system 100 also interfaces with various other insurance systems 130, such as the main claim handling system, the insurance policy management system, etc.

Figure 2:
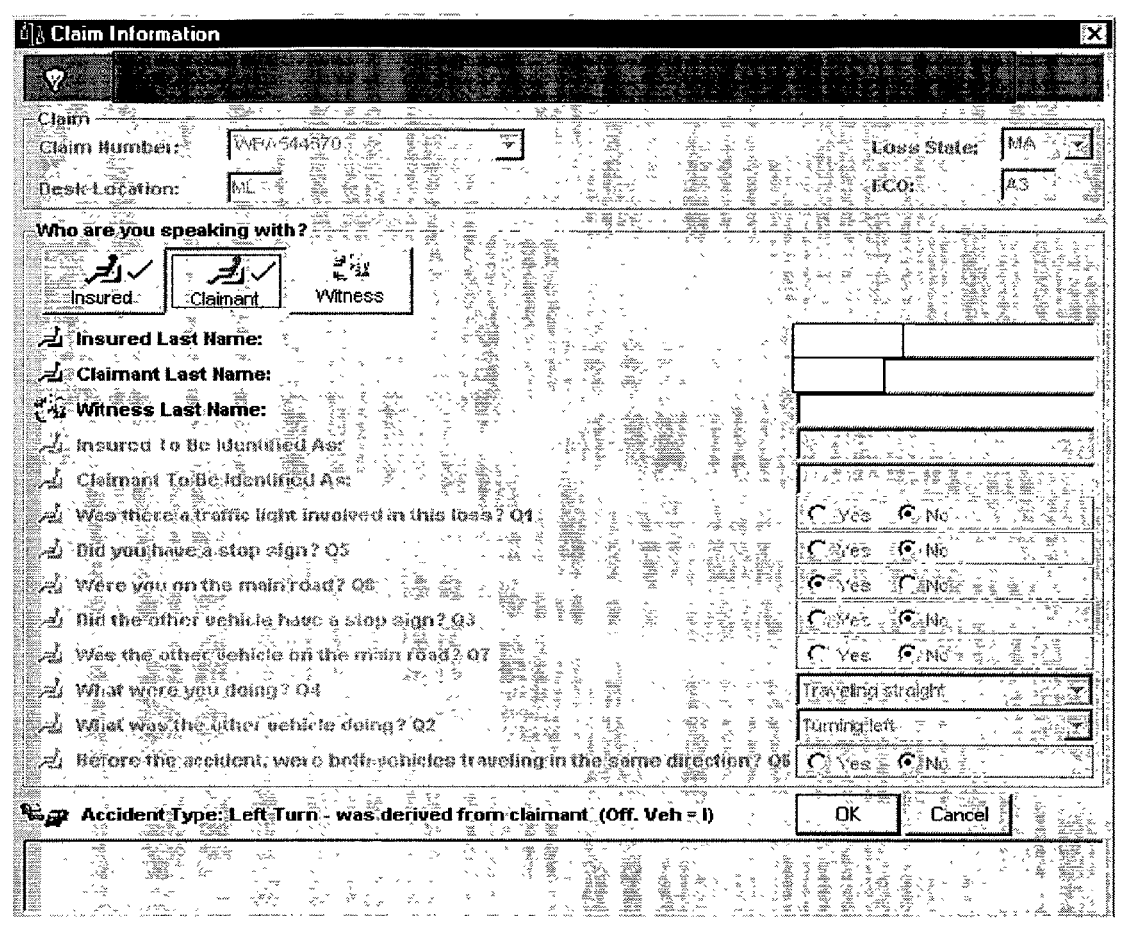
Figure 3:
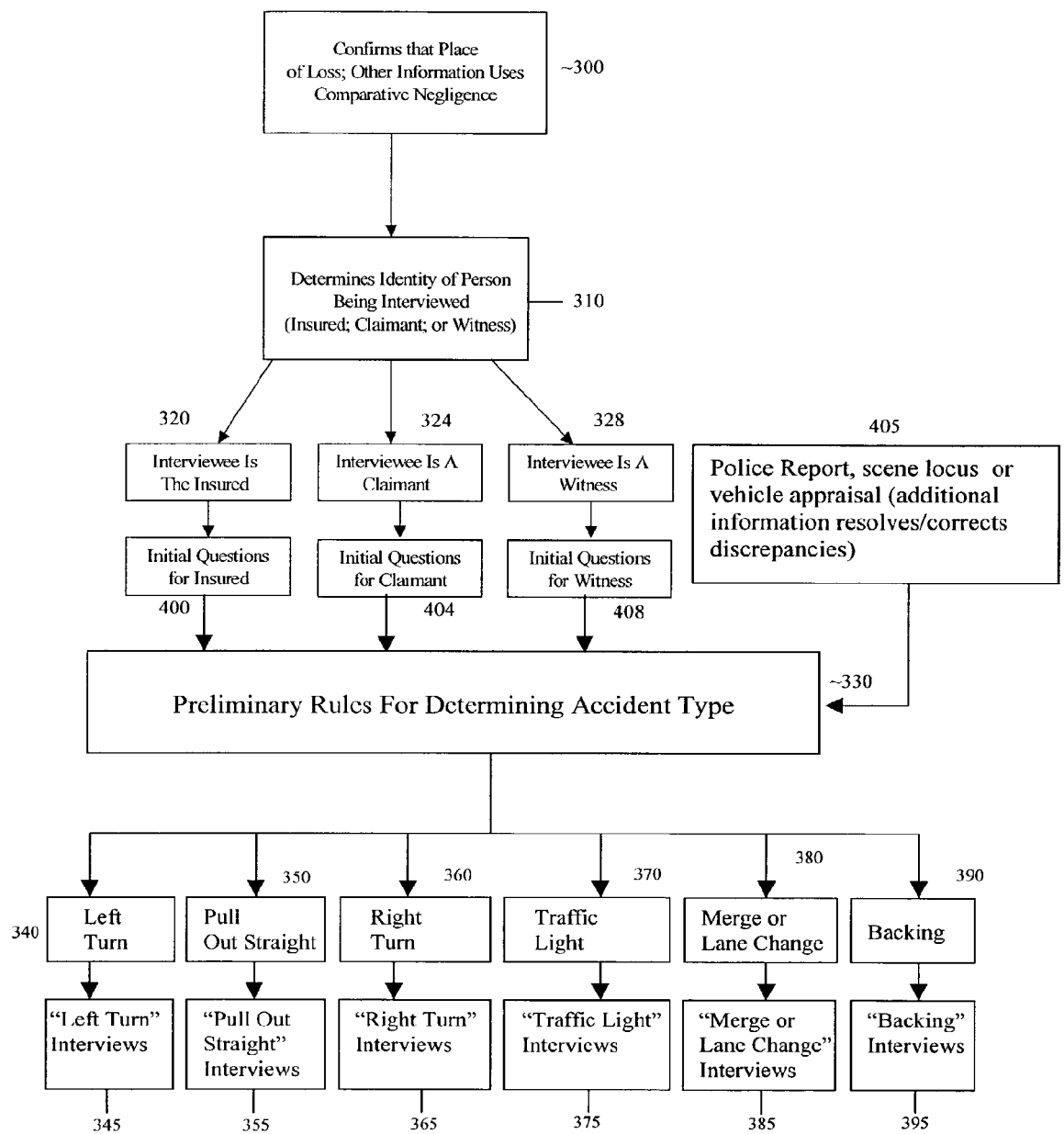
FIG. 3 is a flow chart describing the process of determining the accident type in accordance with an embodiment of the present invention.
Figure 4:
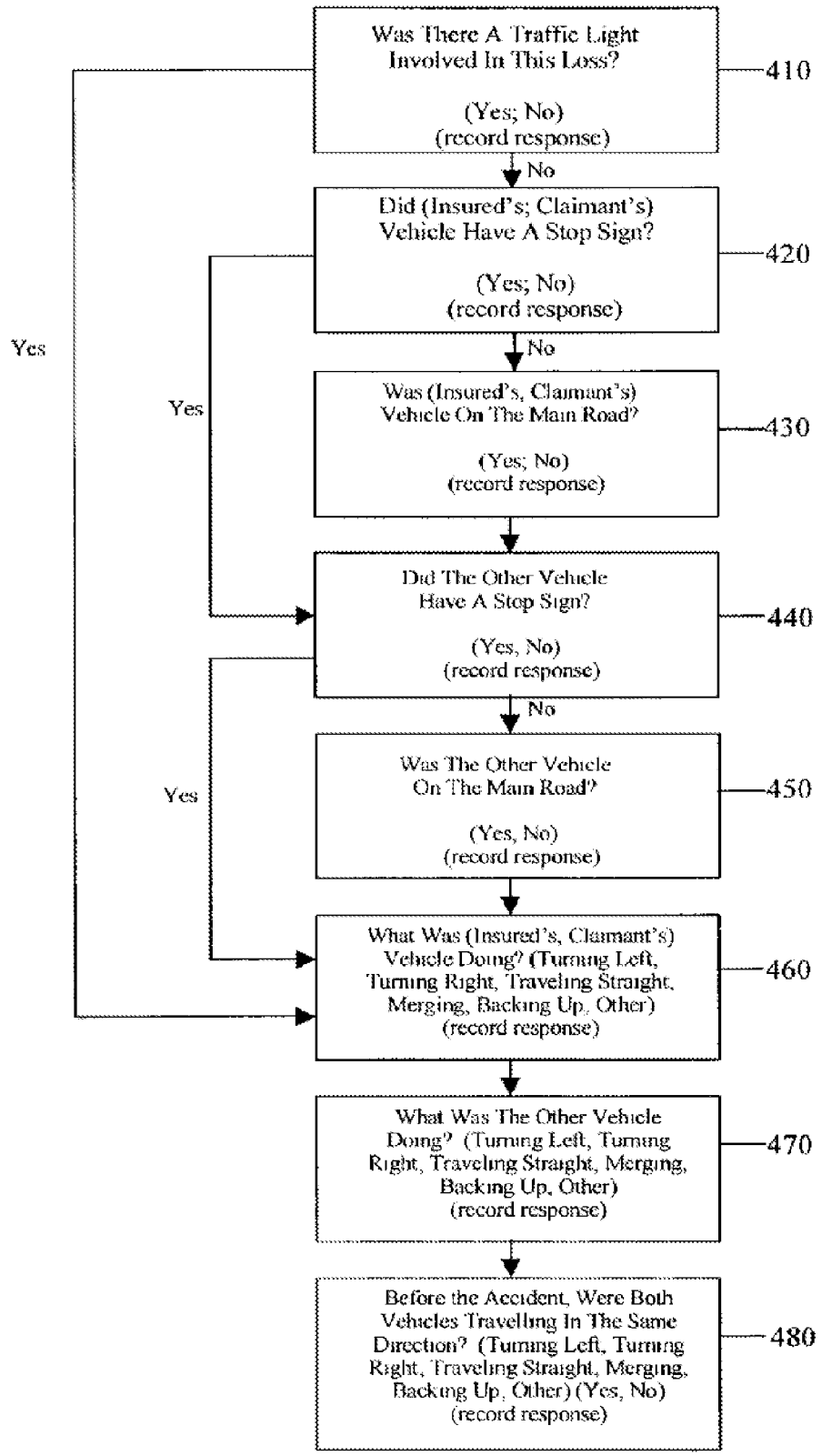
FIG. 4 is an exemplary set of preliminary questions used to determine the accident type in accordance with an embodiment of the present invention.

Turning now to FIGS. 2, 3 and 4, there is described the initial "screening" phase of the system in accordance with an embodiment of the present invention. An investigator becomes aware of an accident when contacted by a party to the accident (i.e., the insured, a witness or the claimant) and interviews that person based on questions generated by the inventive system 100 to determine certain basic data such as the place of the accident in step 300 and the identity of the parties involved in step 310. Also, the system 100 receives a claim number for each claim, i.e., reported accident or loss, from the main claim handling system in step 300. Alternatively, the system 100 generates and assigns a claim number to each claim in step 300. It is appreciated that the investigator can access the inventive system 100 directly from his personal computer. That is, the software of the inventive system may reside in the investigator's computer or investigator can use his computer or mobile device, such as personal digital assistant and the like, to access the inventive system over the communications network, such as the Internet. Alternatively, a party to the accident can communicate with a computer system via telephone, the Internet or otherwise and provide text or voice responses to system prompts such that the system stores answers to a plurality of questions, such as those delineated in FIG. 4 to obtain the basic data relating to the accident.

Assuming that the accident is eligible for comparative negligence analysis, the investigator, following prompts from the system 100, will pose a series of preliminary questions, such as those delineated in FIG. 4, generated by a pre-processing routine or module 110 to the party being interviewed in steps 400, 404 and 408. The questions will typically vary, at least somewhat, depending on the status (insured, claimant, witness) of the person being interviewed in steps 320, 324 and 328, respectively. The investigator will later interview the other parties involved in the accident to the extent possible. For example, if the insured is the first caller in step 320, the investigator will seek to interview the insured based on the initial questions (FIG. 4) generated by the pre-processing module 110 in step 400 and any available witnesses to the accident in step 328. FIG. 4 delineates an exemplary set of preliminary questions that is generated by the pre-processing module 110. Responses to these questions (to the extent applicable) are stored in a central repository or database 120. In Example 1, each question is assigned a number, and each response a corresponding number (for instance question 1 has two possible responses: (1a) for "yes" and (1b) for "no") which permits easier analysis according to the business rules, as is further detailed herein. If a police report exists, data relating to the report is also collected or retrieved electronically from appropriate database 120 in step 405 (FIG. 3).

The process of determining the accident type by the pre-processing module 110 is described in conjunction with FIG. 4. The pre-processing module 110 makes an inquiry to determine if there was a traffic light involved in this claim (i.e., loss or accident) and stores the interviewee's answers in the database 120 in step 410. If the interviewee answers affirmatively to the inquiry in step 410, the pre-processing module 110 proceeds directly to step 460. However, if the inquiry in step 410 is answered in the negative, the pre-processing module 110 makes inquiry to determine if the interviewee had a stop sign and stores the interviewee's answer in the database 120 in step 420.

If the inquiry in step 420 is answered in the affirmative by the interviewee, the pre-processing module 110 proceeds directly to steps 440. However, if the inquiry in step 420 is answered in the negative, the pre-processing module 110 makes an inquiry to determine if the interviewee's vehicle was on the main road and stores the interviewee's answer in the database 120 in step 430 and proceeds to step 440.

In step 440, the pre-processing module 110 makes an inquiry to determine if other vehicles had a stop sign and stores the interviewee's answer in the database 120. If the inquiry in step 440 is answered in the affirmative by the interviewee, the pre-processing module 110 proceeds directly to step 460. However, if the inquiry in step 440 is answered in the negative, the pre-processing module makes an inquiry to determine if the other vehicle was on the main road and stores the interviewee's answer in the database 120 in step 450.

In step 450, the pre-processing module 110 makes an inquiry to determine what the interviewee was doing at the time of the accident, i.e., turning left, turning right, travelling straight, merging, backing up, etc., and stores the interviewee's answer in the database 120 and proceeds to step 470.

In step 470, the pre-processing module 110 makes an inquiry to determine what other vehicle was doing at the time of the accident and stores the interviewee's answer in the database 120.

In step 480, the pre-processing molecule 110 makes an inquiry to determine if both vehicles were travelling in the same direction before the accident and stores the interviewee's answer in the database 120.

The pre-processing module 110 applies a set of preliminary business rules to the responses to the preliminary question to categorize the loss/accident into various accident type in step 330. There are many sets of preliminary responses that will result in a "left turn" accident type determination, many other response sets that will result in a "pulling out" accident type determination, and so on. Of course, the invention is not limited to any particular set of initial question or preliminary business rules.

In certain embodiments of the invention the pre-processing module 110 determines the accident type at least initially, by the answers to preliminary questions of the first party to speak to the investigator. In such an embodiment, another party's contradictory or inconsistent answers pertaining to accident type will be noted by the pre-processing module 110, and business rules designed to resolve such contradictions are employed at a later stage, possibly resulting in a re-determination of accident type. In other embodiments, the pre-processing module 110 considers answers of all parties and/or facts noted in the police report prior to determining accident type.

Referring to the bottom portion of FIG. 3 and to FIG. 4, after the pre-processing module 110 determines or categorizes the accident type in steps 340, 350, 360, 370, 380, and 390, each party is asked a series of more detailed, accident-specific questions generated by the processing routine or module 220 in steps 345, 355, 365, 375, 385, and 395. It is appreciated that since the series of detailed, accident-specific questions can be provided interactively (i.e., one at a time), the questions can be modified dynamically (on the fly) based on the party's responses or answers to previously provided questions. For instance, a more extensive "pulling out" interview will be used in step 355 after the accident is determined to be a "pulling out" accident type in step 350. For each detailed interview, responses to the detailed, accident specific interview questions are stored in the database 120 for further analysis by the processing module 200.

The processing module 200 applies a second set of business rules, typically more complex than the preliminary rules due to the larger number of questions involved to the answers to the accident-specific question set. As with the accident type determination, included are business rules designed to resolve conflicting or inconsistent responses. The processing module 200 applies the second business rule set to the responses to certain questions to arrive at a point of impact score which is the initially assessed value for the insured's degree of comparative negligence. The processing module 200 then adjusts the point of impact score up or down depending on the responses to questions from the detailed interviews (conducted by the investigator or the system wherein the insured, claimant or witness answers the detail question on-line) which focus on line of sight, speed, evasive actions and traffic citations.

FIGS. 6 through 9 are computer screens which the investigator, claimant, insured or witness, would see and use in certain embodiments of the invention. The invention is, of course, not limited to any particular computer program or even to application on a computer system or server, although a computer-based system is preferred.

The invention is better understood by reference to certain examples. Example 1 is describes a typical "pulling out" accident as recalled by both a claimant and an insured. As is typical in investigating most accidents, the parties agree on certain details of the accident, disagree on other details, and simply cannot recall other relevant facts. The inventive system 100 is able to analyze these facts to determine the accident type in steps 340, 350, 360, 370, 380, and 390 and then to determine the degree of comparative negligence of the insured in step 520 (FIG. 3). A detailed analysis of the facts of Example 1 is described below in the further Examples 2 through 10.

Accident—Type Determination

The system 100 will initially determine the accident type by application of preliminary business rules to a preliminary set of questions in steps 340, 350, 360, 370, 380, and 390. One possible set of preliminary questions is set out in Example 2, herein. A possible set of responses to these preliminary questions based on the fact set forth in Example 1 are summarized in a table in Example 3.

The business rules described in Example 4 can be applied to the responses summarized in Example 3 by the pre-processing module 110 to determine accident type in step 330. Example 4 also shows business rules applicable to other possible responses to the preliminary questions. These additional examples were chosen to show that different responses could result in the determination of other accident types. However, there are also many possible response sets that will result in the same accident type being determined. Preliminary business rules exist for every possible combination of responses. (In Example 4, the pre-processing module 110 applies the preliminary rules in step 330 to determine accident 1 as a "left turn" accident in step 340, accident 2 as a "pulling out straight" accident in step 350, accident 3 as a "right turn" accident in step 360, accident 4 as a "traffic light" accident in step 370, and accident 5 as "changing lanes" accident in step 380.)

Referring to the second listed business rule in Example 4, it is seen that where the responses to the preliminary questions are as shown in Example 3, the pre-processing module 110 determines the accident to be a "pulling out" type accident in step 350. It is appreciated that this determination is consistent with an experienced investigator's "gut feel" assessment of the accident described in Example 1. That is, the insured's car was hit as he was pulling straight out into the intersection from a stopped position.

Figure 5:
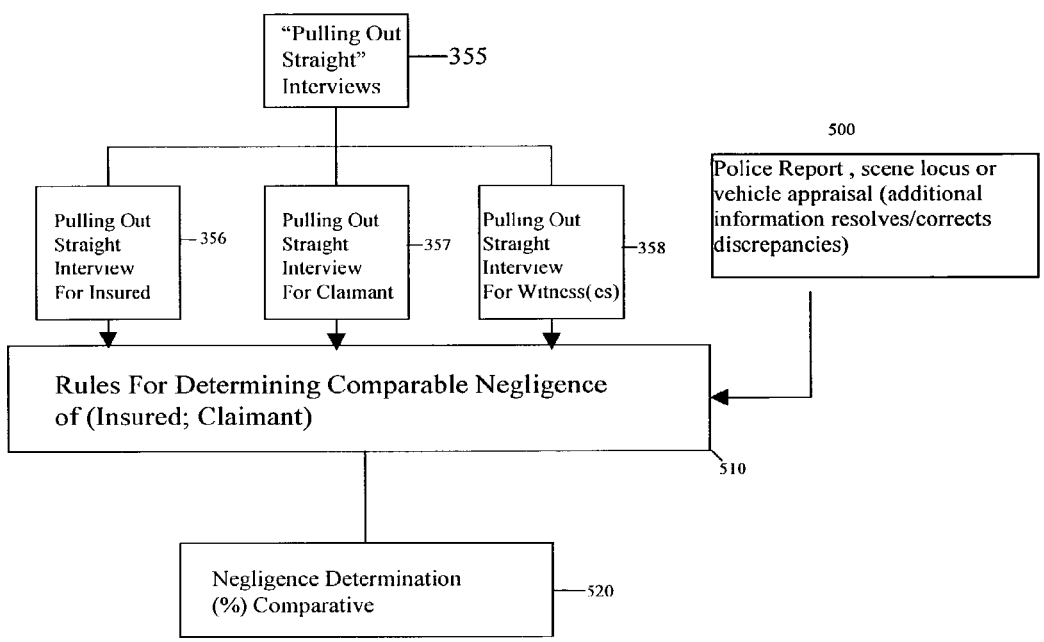
FIG. 5 is a flow chart describing the process of determining degrees of comparative negligence in accordance with an embodiment of the present invention.

It is seen in Example 4 that each business rule includes further instructions for accident specific interviews. Turning now to FIG. 5, as required by the above-discussed business rule, for example, if the insured calls the investigator before the claimant, the pre-processing module 110 will first determine that the loss resulted from an "accident 2" type accident, i.e., a "pulling out" accident, and the processing module 200 will then direct the investigator to give the "pulling out" interview to the insured in step 356. That is, the processing module 200 generates a plurality of questions to enable the investigator or the insured to provided information relevant to the "pullout" accident in step 356. If the claimant calls first, the system 100 directs the investigator to conduct the "pullout" interview to the claimant in step 357. If a witness calls, the system 100 directs the investigator to conduct the witness interviews in step 358, and is further directed to give the "pulling out" interview to the insured in step 356 and to the claimant in step 357.

Figure 6:
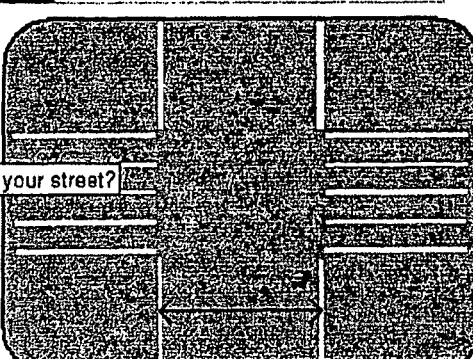
Figure 7:
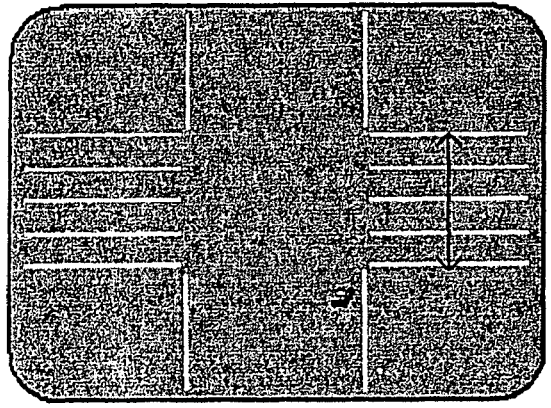

Having determined that the accident described in Example 1 is a "pulling out" accident by the pre-processing module 110, the processing module 200 generates and poses additional questions, such as those shown in FIGS. 6-8, tailored to "pulling out" accidents to each of the involved parties in step 355. Example 5 is one possible "pulling out" vehicle interview for the first caller (i.e., insured or claimant) that is generated by the processing module 200 in step 356 or step 357. Example 6 is a possible "other" vehicle interview (i.e., insured or claimant) to be used in connection with a "pulling out" accident type in step 356 or 357. Example 7 is a "witness" interview to be used in connection with a "pulling out" accident type in step 358. Finally, Example 8 describes a list of issues, generally corresponding to the issues addressed by the "pulling out" interviews of Examples 5, 6 and 7, to be ascertained from the police report in step 500 (see FIG. 9).

Figure 10:
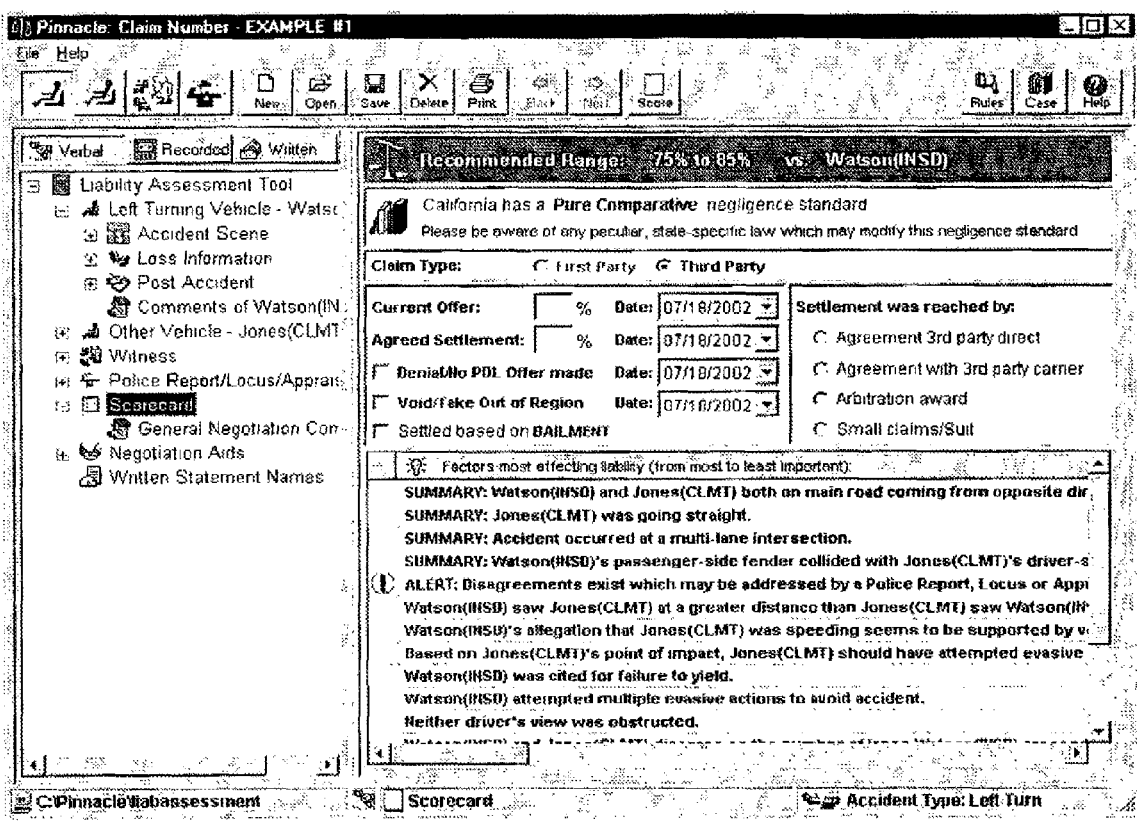
FIG. 10 is an exemplary screen shot of the negotiation aid screen in accordance with an embodiment of the present invention.

Example 9 determines the accident details as set forth in Example 1 that have been converted to a set of responses by the processing module 200 to the "pulling out" interview of Examples 5 and the "other" vehicle interview of Example 6.

Where applicable the processing module 200 preferably considers or consults the police report, scene locus or vehicle appraisal (PRLA) for additional details about the accident in step 500. As shown in FIG. 10, in accordance with an embodiment of the present invention, the processing module 200 notifies the insurance investigator or claims adjuster to utilize the police report, scene locus or vehicle appraisal to resolve certain disagreement between the parties (e.g., insured and claimant). It is appreciated that certain disagreements can be weighted, such as those information that one party has better knowledge of than the other (party's own actions), information that can be independently verified (e.g., witness corroboration, police report, scene locus or vehicle appraisal), etc.

For example, if the disagreement is over the point of impact or contact on the insured's vehicle, then the processing module 200 weighs the insured's response higher than claimant's since the insured's knowledge of his/her vehicle damage is presumed superior to claimant's. However, certain disagreement cannot be weighted, such as whether a vehicle had its head lights on or off. The processing module 200 then summarizes the responses as shown in Example 9. (Because there were no witnesses to this accident, the witness interview is not relevant in this particular accident).

Point of Impact

The point of impact module or routine 210 of the processing module 200 processes the responses to the accident specific interviews to determine a score for the insured's and/or the claimant's degree of negligence. In making this determination, the point of impact module 210 applies point of impact business rules to the responses relevant to the point of impact determination, such as the location and type of damage incurred in the accident or loss, in step 510. The answers to questions 24, 26, 30, 64 and 111 are used in one embodiment of the present invention to determine the point of impact factors. Moreover, a point of impact chart which incorporates these rules, exist for every possible combination of responses.

Where the response of the parties conflict, the conflict resolution module or routine 220 of the processing module 200 applies system conflict resolution business rules to determine which responses to use in calculating a comparative negligence score. Referring to Example 9, the claimant's answers matched those of the insured with the exception of the claimant's evasive action (none vs. no answer), the insured's point of impact (driver-side fender vs. driver-side middle), and whether the insured had a stop sign (no vs. unknown). The general rules dictate when one party answers "unknown" or does not answer, the other party's answer is used. When one party is presumed to have better knowledge of the situation, then the conflict resolution module 220 handles the disagreement concerning the point of impact by using the answer of the party presumed to have better knowledge. For example, If there was no police report or vehicle appraisal answer for a question relating damage to the insured's vehicle, the conflict resolution module 220 uses the insured's answer to this question since the insured is a better judge of his own damages. However, in this example, there is a vehicle appraisal which overrides all other answers. The ultimate result will not be any different since the police report agrees with the insured's answer. Therefore, the answers (26a, 24b, 30a, 64a, 111b) are used by the conflict resolution module 220 and the point of impact module 210.

A point of impact chart for the response set: [26a+24b+30a+no 64c or d+no 111a], where response 64a translates to "no 64e or d" and 111b translates to "no 111a", is depicted at Example 10. (Other point of impact charts of course are used where other combinations of variables illustrate the basic accident facts.) The point of impact module 210 based on the Example 1 responses determines the relevant point of impact factors or issues, such that the insured (who pulled from the stop sign and is thus the "offending" vehicle) pulled out from a secondary road in front of the claimant, who was driving on the primary road without a stop sign. The claimant came from the insured's left and did not swerve either left or right.

Using the point of impact chart of Example 10, the point of impact module 170 uses the answers to questions 58 and 60 (describing the actual points of impact for each car) to pinpoint the final score for this section. Since the column under response (58e) intersects with the row beside response (60a) at "95" on this particular chart, the point of impact module 210 determines the insured's initial liability score or raw liability score to be 95 percent. The point of impact module 210 transmits the initial liability score of ninety percent (95%) to the processing module 200.

Next, the processing module 200 adds or subtracts various other modules of percentage points based on the application of other business rules to responses relevant to line of sight, speed, evasive actions, and citations issues.

Line of Sight

With regard to line of sight, the following responses are deemed relevant by the line of sight routine or module 230 in the example provided herein: First, the insured admitted that although the visibility was poor, he did not use windshield wipers. The line of sight utilizing module 230, a business rule that covers this situation: If (105b) and Insured admits (13b), than +1%. For "pulling out distance", the line of sight module 230 incorporates the business rules into a matrix (similar to Example 10) which shows that when "pulling out distance" responses are, as is the case here, [6a+51a+36a+42e] is a 0% weight. Like pulling out distance, the line of sight module 230 compares the distance between vehicles as seen by each party at key points in the chronology of the accident, i.e., the "first sight" factor. Since the insured did not see the other vehicle and vice versa, the line of sight module 230 assesses a 0% weight. Finally with respect to other line of sight issues, the line of sight module 230 deems the parties' responses regarding multiple lane crossings, driving in the proper lane, stopping, driving in the proper direction, distractions and sun glare as not relevant under this embodiment's rules.

Based on the above analysis of line of sight factors, the line of sight module 230 adds a total of +1% to the initial point of impact score of 95%. The line of sight module 230 transmits assessment of one percentage (+1%) for line of sight factors to the processing module 200.

Speed

The speed routine or module 240 of the processing module 200 considers speed based factors next. The insured alleges that the claimant was speeding, and the heavy damage to both vehicles seems to support that. Here the claimant's answer that the insured's vehicle had moderate (vs. heavy) damage disagrees with the insured's answer. However, the conflict resolution routine or module 220 applies the dispute resolving business rules on this question in the absence of a police report, scene locus or vehicle appraisal answer to determine thereof the insured's answer is to be used since the insured is in the best position to relate the extent of his vehicle's damage. This leads the speed module 240 to apply the following business rule: (59c, i.e., heavy damage to insured's vehicle)+ (61c, i.e., heavy damage to claimant's vehicle)+(no witness (93b), i.e., there was no witness denying claimant was speeding)+((43a)>(34a) by 10-15 mph, i.e., insured claims claimant was speeding by 10-15 mph)=–(negative)10%.

The speed module 240 considers the factors "speed greater than reasonable" and "entering with caution" are based on witness answers. Since there is no witness to this accident, the speed module 240 does not consider these factors. Also, other factors can be considered by the speed module 240 if they are deemed relevant such as skid marks, claimant's perception of insured's speed, etc. Skid marks may be relevant, but there were none described in the Example provided herein to be considered by the speed module 240. Moreover, because the claimant did not answer the questions regarding his perception of the insured's speed, the speed module 240 does not apply any rules pertaining to the insured's speed.

Based on the above analysis of speed factors, the speed module 240 subtracts a total of –10% from the initial point of impact score of 95%.

Evasive Actions

Next, the evasive action factors, the parties' evasive actions or failure to take evasive actions, are considered by the evasive actions routine of module 250. The insured stated that he swerved right to avoid the claimant. Based on the insured's response to question 62 (response 62d), the evasive actions module 250 adds two percentage points (+2%) to the base score as a result of applying the following business rule: If only one selection (63c, d, e, or g) then +2%. Additionally, the insured alleges the claimant did nothing to avoid the accident. The insured's answers satisfy the business rule: (26a)+(64a)+ (no response 36a by claimant)+60a)=–3%, which translates to "claimant was approaching the insured from the left; claimant did not say there was an obstructed view; claimant took no evasive action; claimant's point of impact was to the front end of the car." That is, the evasive actions module 250 makes an inference that based on the point of impact, the claimant should have taken evasive action. The application of this rule by the evasive actions module 250 results in a weight of –3%.

Since the claimant did not answer the questions regarding his own and the insured's evasive actions, the evasive actions module 250 uses the insured's answers. The two weights assessed by the evasive actions module 250 were +2% and –3%, thereby making the total for evasive action –1%.

Citations

Finally, the citations routine or module 260 considers citations. Here, the insured's and claimant's answers are in direct conflict with one another (no vs. yes). In the absence of a police report, the conflict resolution module 220 can use the insured's answer ("no") based on the conflict resolution business rule because the insured is in the best position to answer whether he received a citation/warning or not. However, the police report, which overrides all other answers, states that the insured was cited for failure to yield. Accordingly, the conflict resolution module 220 instructs the citation module 260 to apply the following business rule: If (79a) and only one police report (80a, b, c, d, or j) (translation: if there was a citation issued and it was for only one violation from the group: failure to yield, failure to use caution, improper turning, speeding or disregarding stop sign), which results in three percentage points (+3%) being assessed for the citations. The citation module 260 transmits the three percentage points (+3%) assessed for citation to the processing module 200.

Final Calculation

After points are assessed for the above-mentioned factors, the processing module 200 recalculates the raw liability score based on the impact from the various modules. As described here, the processing module 200 modifies the raw liability score of 95% determined by the point of impact module 210 with various assessments determined by the line of sight module 230, the speed module 240, the evasive actions module 250 and the citation module 260. That is, the initial raw score of ninety-five percent (95%) to eight-eight percent (88%) is modified by adding +1% from the line of sight module 230, −10% from the speed module 240, −1% from the evasive actions module 250 and +3% from the citations module 260. The raw score is 95%+(+1%)+(−10%)+(−1%)+(+3%)=88%. In accordance with an embodiment of the present invention, the processing module 200 rounds the raw score to the nearest 5% (if necessary), or 90%. The processing module 200 then determines or derives liability range from subtracting 10% from this rounded raw score of 90%, defining the low end of the range. The rounded raw score then represents the high end of the range. Therefore, for this accident, the processing module 200 determines the current liability range to be 80%-90%.

Post-Calculation Procedures

Having determined a liability range, the insurance investigator may then use this determined value in several ways, including in negotiating settlements with claimants and determining acceptable dollar value ranges for settlement. For instance, where the insured's liability range is 80%-90% as in the example above, the investigator may determine that a "ceiling" for settling a $10,000 claim may be $8,000-$9,000. Also, the claims adjuster can modify the recommended liability range based on additional information that the inventive system cannot or did not evaluate in determining the liability range, such as the credibility of the parties.

The liability range may also be applied to the tort laws of the state in which the accident took place, either by the investigator or by the computer program or system. State law will be particularly relevant where the claimant's liability range is in the vicinity of 50% since, as noted previously, the laws of the majority of states prohibit to recovery by a party who is 50% or 51% at fault.

Figure 11:
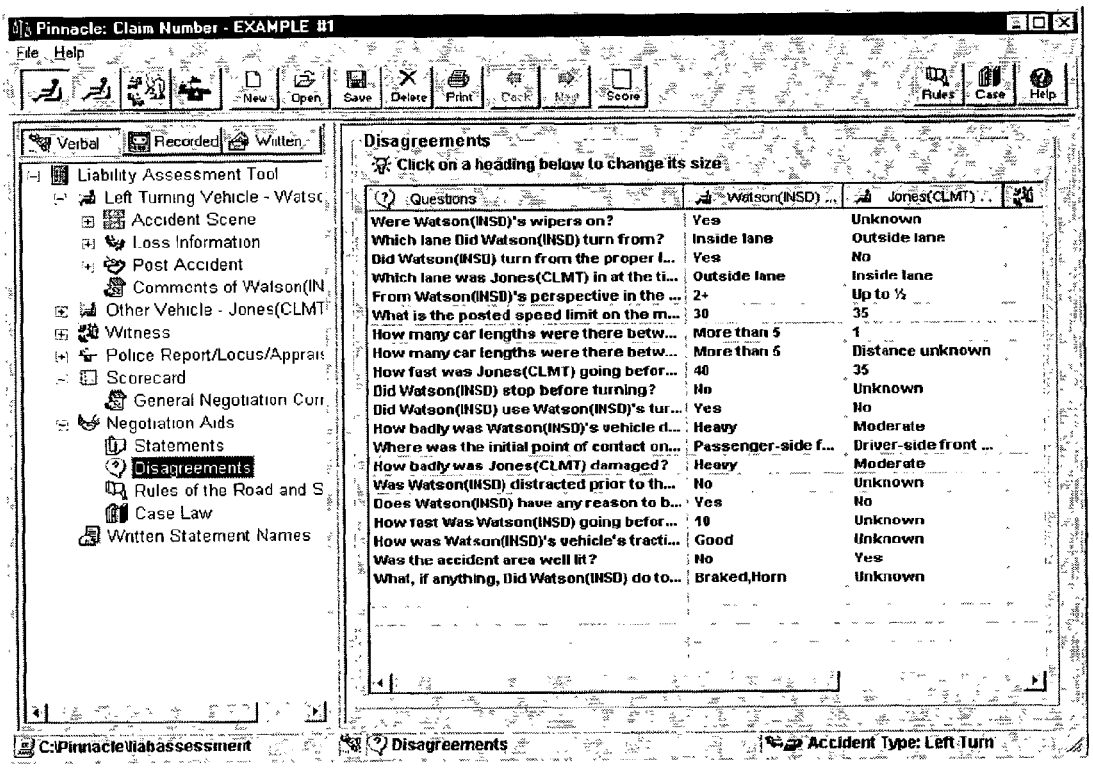
FIG. 11 is an exemplary screen shot of the disagreement negotiation aid screen in accordance with an embodiment of the present invention.

In accordance with an embodiment of the present invention, the inventive system can he employed to generate screen or reports useful as "negotiating aids," such as a recommended liability range negotiation aid screen of FIG. 10 and "Disagreements" negotiation aid screen of FIG. 11. The negotiation aid screen of FIG. 10 provides the investigator with a recommended liability range and various factors affecting insured's liability in the claim to assist the insurance investigator in negotiating a settlement with a claimant. Such screens or reports would show the investigator lists or tables summarizing salient details of the accident, such as the recommended liability range, factors affecting liability, the facts about which the parties disagree, the statements of the various parties, the "rules of the road" for the relevant state or municipality, case law pertaining to similar accidents in the relevant state, or any other tabulation or compilation of collected data that would allow the investigator, who is typically handling many claims at any one time, to quickly grasp the relevant facts and law. For example, a negotiation aid screen can lists the salient details of an accident relating to the headlights and involving insured and claimant:

| Details | Impact on liability |
|---|---|
| Accident happened during darkness; insured admits headlights were not on | +3% |
| Visibility was poor; insured admits headlights were not on | +3% |
| Accident happened during darkness with poor visibility; insured A admits headlights were not on | +3% |
| Accident happened during darkness; claimant admits headlights were not on | −3% |
| Visibility was poor; claimant admits headlights were not on | −3% |

Reporting Module

Figure 14:
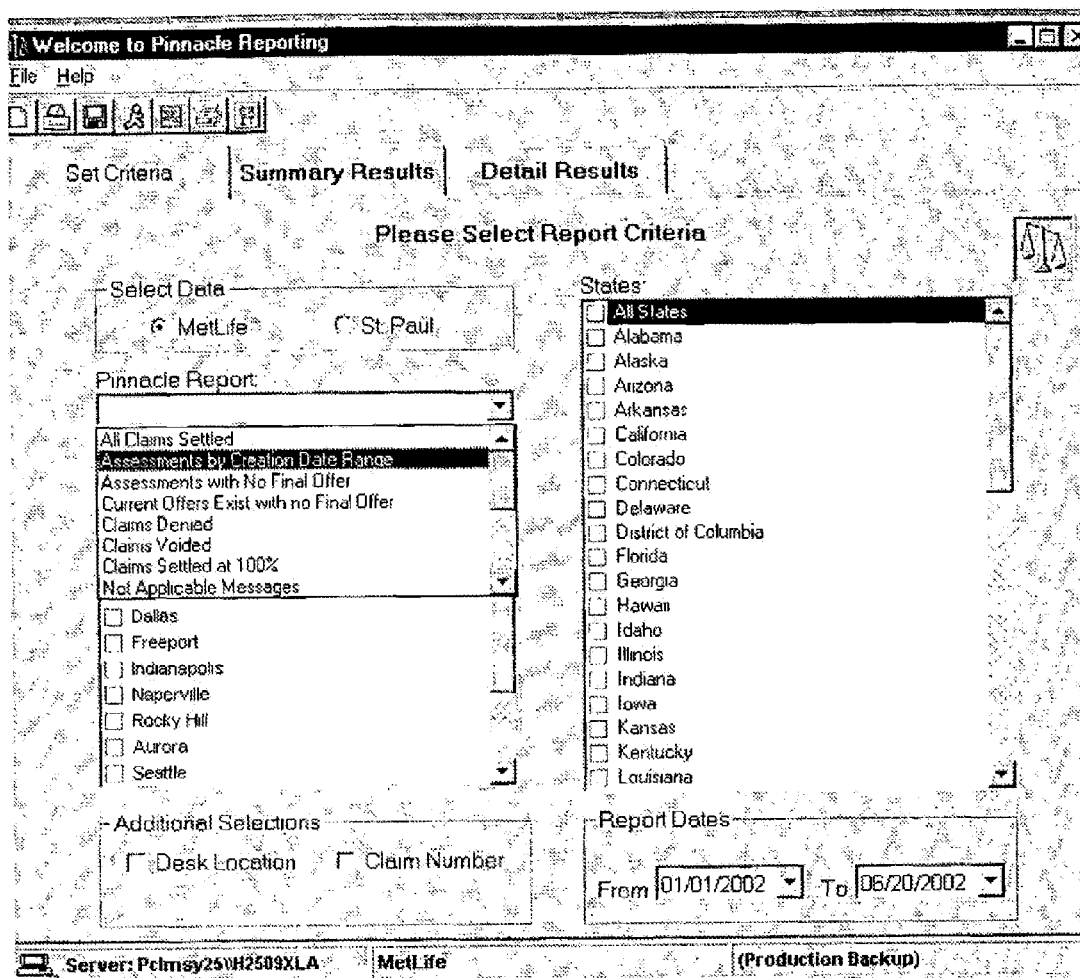
FIG. 14 is an exemplary screen shot of the report selection screen in accordance with an embodiment of the present invention.

In accordance with an embodiment of the present invention, the inventive system 100 includes a reporting module 150 for collecting settlement information and generating settlement report. After a claim is settled, the claims adjuster can enter the settlement information on the exemplary settlement information screen of FIG. 12. The settlement information can include the liability percentage settlement, liability percentage offer, form of settlement (directly with third party, with third party carrier, arbitration, small claims/suit), and the like. Alternatively, after each claim is settled, the processing module 200 transmits the settlement information to the reporting module 150 by populating the settlement report screen. The reporting module 150 permits the user to generate settlement reports based one or more criteria, including but not limited to, claims office(s), state(s), date range, claims adjuster, denied claims, voided claims and settled claims, as shown in FIG. 13. As shown in FIG. 14, the user can select a settlement summary report from a plurality of reports, including but not limited to:

1. All Settled Claims: Displays all claims that have settlement percentage keyed in the settlement field (not shown).
2. Assessments by Creation Date: Displays claims entered into the system within a specified time period.
3. Assessments with No Final Offer: Displays claims that do not have settlement percentages keyed in the settlement field.
4. Current Offer Exists with no Final Offer: Displays claims that have a percentage keyed in the Current Offer field (not shown).
5. Claims Denied: Displays claims where no payment to a claimant was made due to a denial or no offer being made.
6. Claims Voided: Displays claims where the claim was entered in error. Pulls claims out of all other reports.
7. Claims Settled at 100%: Displays all claims that have 100% keyed in the Settlement Field.
8. No Applicable Range: Displays all claims entered where the inventive system could not generate a recommended range.
9. Payment Rate: Displays payment rate for office, adjuster or versus the high end of the system's recommended range.
10. Pending: Unlike the other reports, this information is pulled directly from other computer system, such as the claim handling system, and alerts the adjuster to potential cases that have not been entered into the system.
11. System Not Required: Displays claims that have initial loss types that would appear to fit, but were not entered due to the way the initial screening questions were answered (validation box or pre processing model). The information is pulled from the claim handling system.

12. Settlements Above Range: Displays claims where the settlement percentage keyed in the settlement field is higher than the high end of the system's recommended range.
13. Settlements Below Range: Displays claims where the settlement percentage keyed in the settlement field is below the low end of the system's recommended range generated.
14. Settlements Within Range: Displays claims where the settlement percentage keyed in the settlement field is within the system's recommended range.
15. Settlement Offers Out of Range: Displays all claims where the settlement percentage keyed in the settlement field is outside the system's recommended range.
16. Settlement Offers Out of Range with No Comments: Displays all claims where the settlement percentage keyed in the settlement field is outside the system's recommended range and there are no accompanying comments.

Figure 15:
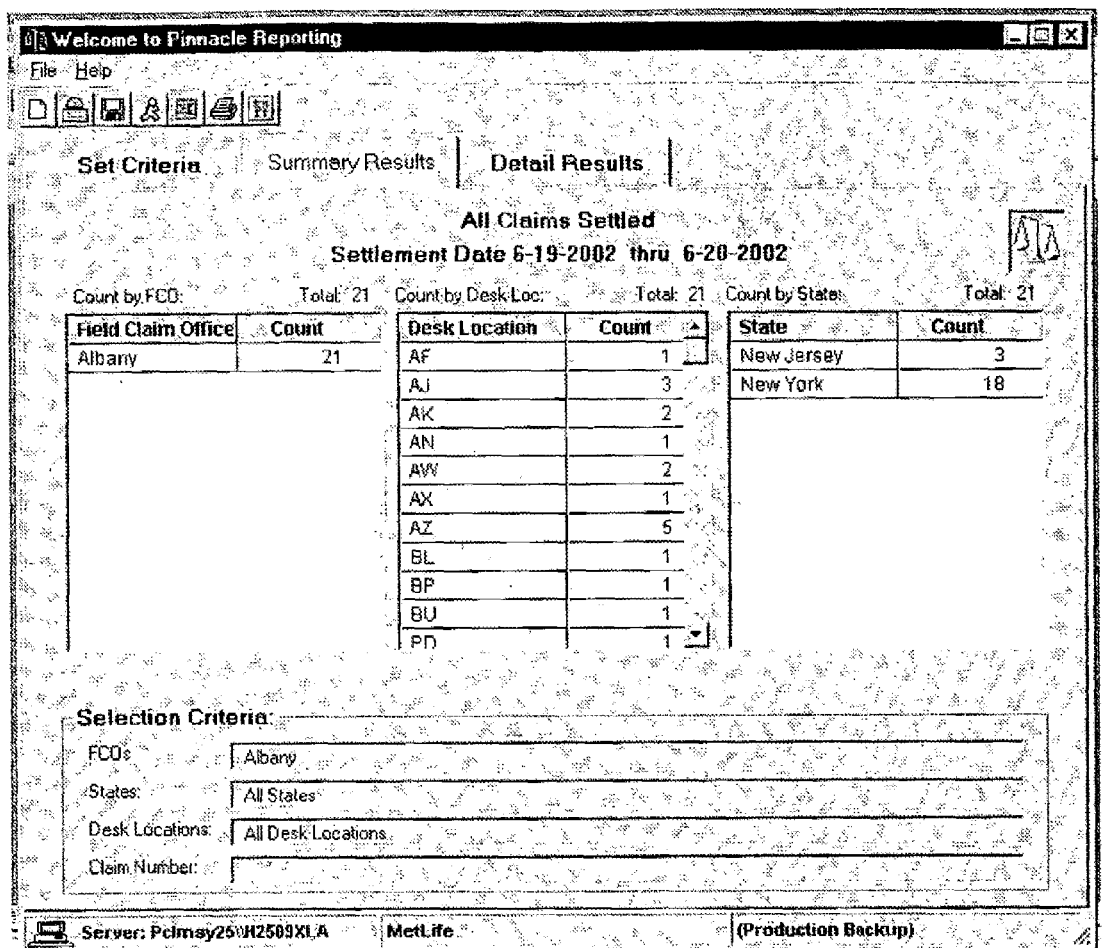
FIG. 15 is an exemplary screen shot of the settlement summary report screen in accordance with an embodiment of the present invention.
Figure 16:
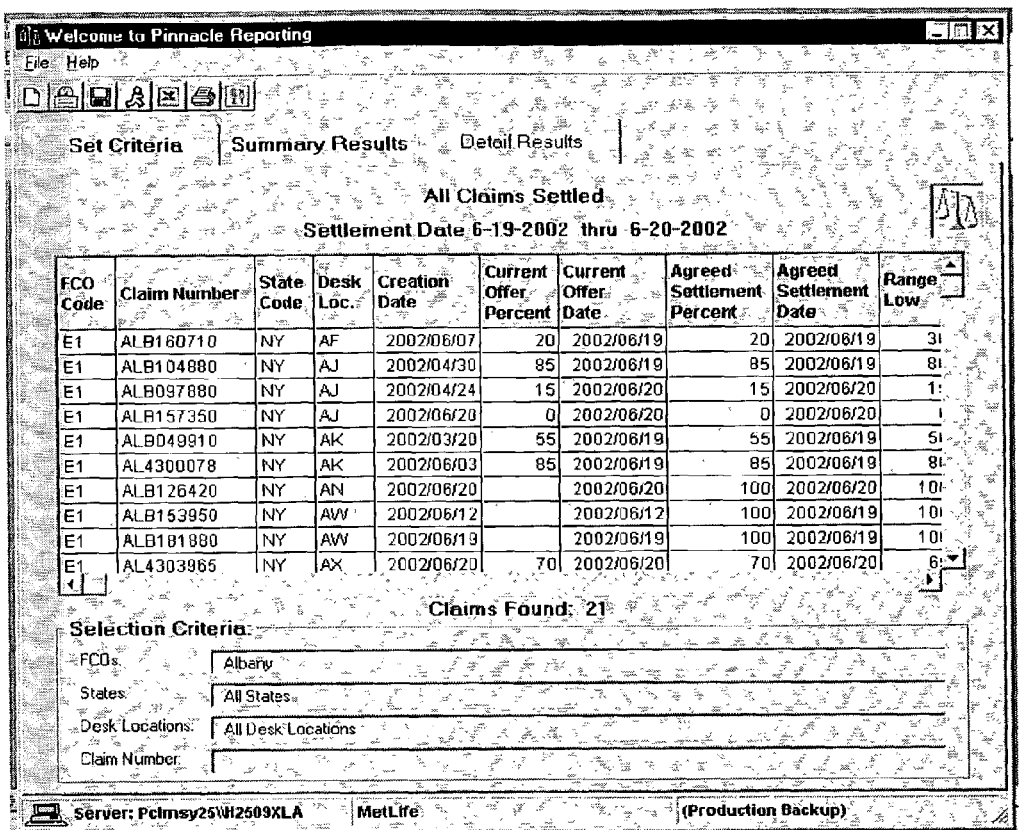
FIG. 16 is an exemplary screen shot of the detail results reporting screen in accordance with an embodiment of the present invention.

Accordingly, to generate the desired settlement report, the user selects a report from a list of available reports, such as "All Settled Claims" report and selects one or more claims offices, such as all claims office, a single claims office, or any combination of the claims offices, from the reporting screen of the reporting module 150 (FIGS. 13 and 14). Additionally, the user can select "desk location" from the reporting screen of the reporting module 150 (FIGS. 13 and 14) to generate the summary report for a particular claims adjuster or a group of claims adjusters. For Example, the user can generate a settlement report for all claims settled by the Albany claims office from Jun. 19, 2002 to Jun. 20, 2002 by selecting the "Set Criteria" tab on the reporting screen of the reporting module 150 (FIGS. 13 and 14) by entering the appropriate criteria. The reporting module 150 displays the settlement summary report, as shown in FIG. 15, or the user can select the "Summary Results" tab to view the settlement summary report. Generally, the settlement summary report displays the total by field claims office (FCO), adjuster and state. In this example, the settlement summary report displays all settled claims by FCO, adjuster and state, and the user can print the settlement summary report by FCO, adjuster and state. To obtain detailed information about the settled claims, the user can select the "Detail Results" tab of the reporting screen of the reporting module 150 (FIG. 16). It is appreciated that the user can use the reporting module 150 to print the detail settlement report or export the report as an Excel document for further analysis.

Arbitration Module

In accordance with an embodiment of the present invention, the invention system 100 includes an arbitration module 160 for generating an arbitration package including but not limited to arbitration contention forms and supporting documents such as insured statement, claimant statement, witness statement, accident diagram, rules of the road or motor vehicle statues and case law references. The arbitration module 160 can prepare the arbitration package for submission to various arbitration forums, such as Automobile Subrogation Arbitration and Special Arbitration.

The insurance adjuster may not be able to settle the claim with the claimant's insurance carrier for variety of reasons, e.g., dispute over liability, etc. In such instance, the insurance adjuster can potentially turn to arbitration to resolve the claim if at least the insured has completed the interview statement, i.e., completed preliminary and accident specific interviews.

Figure 17A:
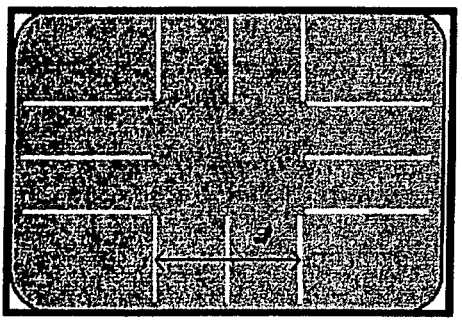
FIGS. 17A-D are exemplary background diagrams.
Figure 17B:
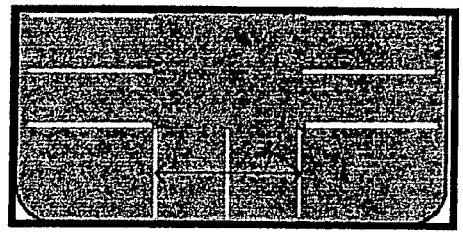
Figure 17C:
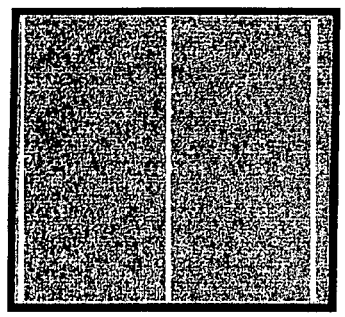
Figure 17D:
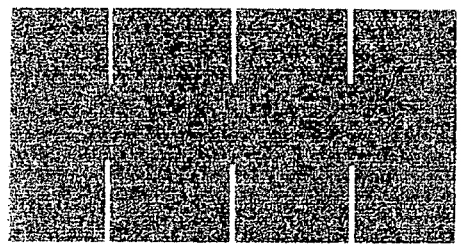

The arbitration module 160 can prepare the accident diagram based on the insured, claimant, witness or Police Report, Locus and Appraisal (PRLA) statements or any combination thereof. In accordance with an embodiment of the present invention, the arbitration module 200 establishes background for the accident diagram or offers roadway choices, such as shown in FIGS. 17A-D, based on the insured, claimant, witness or Police Report, Locus and Appraisal (PRLA) statements or any combination thereof. The diagram of FIG. 17A depicts general intersection of two roadways, FIG. 17B depicts "T" intersection or parking lot entrance/exit, FIG. 17C depicts a general roadway, no intersecting streets, and FIG. 17D depicts a parking lot, such as left turning vehicle existing a parking space. Other roadway diagrams in addition to those shown in FIGS. 17A-D are also contemplated in the present invention, such as roadway with traffic merging, vehicle exiting to the left, vehicle exiting to the right, etc. For example, the interview question may comprise the following:

400. Could you describe the area where the accident happened?
    (400a) Intersection of two roadways
    (400b) Intersection of a roadway and a driveway or parking lot entrance/exit
    (400c) At a "T" shaped intersection
    (400d) In a parking lot
    If (400d) then 401. Did the accident occur
    (401a) When pulling from a parking space
    (401b) At intersection of parking lot isles It is appreciated that for a particular accident type, not all of the roadway choices 17A-E may be applicable. For example, for a "left turn" accident, the processing module 200 will not display FIG. 17C as one of the available roadway choices. That is, the processing module 200 uses the following choices in establishing or selecting diagram background:

If (400a) then display roadway depicted in FIG. 17A;
    If (400b) then display roadway depicted in FIG. 17B;
    If (400c) then display roadway depicted in FIG. 17B;
    If (401a) then display roadway depicted in FIG. 17D; and
    If (401b) then display roadway depicted in FIG. 17A.

Once the diagram background has been chosen, the processing module 200 establishes the orientation of the vehicles from the accident specific interviews with insured, claimant and/or witness, specifically the processing module 200 can utilize the responses to questions (24), (26) and (30) as delineated in Examples 5 and 6. For example, if the processing module 200 selects the roadway depicted in FIG. 17A as the background diagram for the left turn accident, then the processing module 200 uses the response to question (26) to establish the vehicle orientations:

26. Before the accident, where was the other vehicle coming from?

| (26a) from your left | (26b) from your right |
|---|---|
| (26c) from opposite direction | (26d) unknown |

Figure 18:
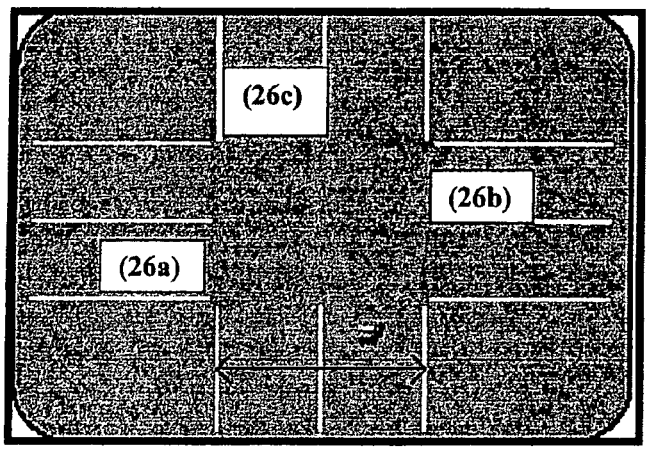
FIGS. 18 and 19A-C are exemplary vehicle orientation diagrams.

In accordance with an embodiment of the present invention, the processing module 200 places the left turning vehicle (LTV) in the lower quadrant of the diagram, preferably at an angle tilting left to indicate the turning motion, and places the other vehicle (OV) based on the response to question (26) as shown in FIG. 18:

If (26a), place OV in direction coming from LTV's left;
If (26b), place OV in direction coming from LTV's right;
If (26c), place OV coming from opposite direction of LTV; and
If (26d) or no answer to (26), the processing module 200 generates message that diagram cannot be generated until direction of OV is known.

Figure 19A:
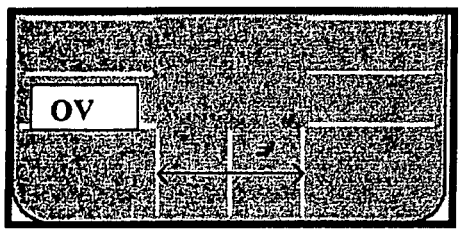
Figure 19B:
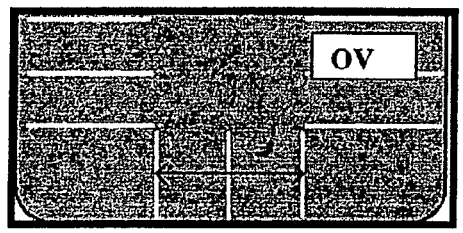
Figure 19C:
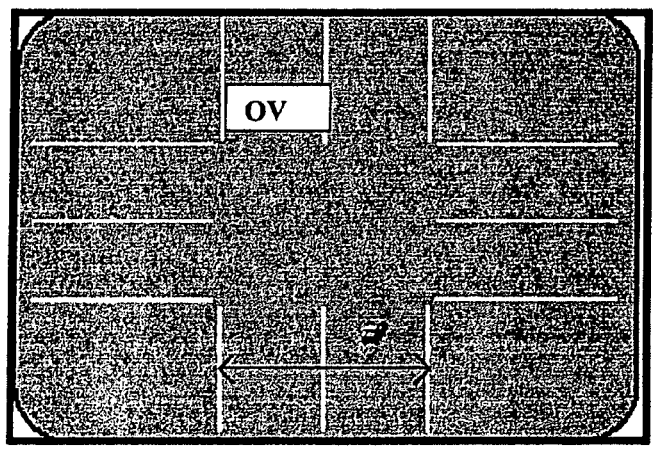

However, if the processing module 200 selects the roadway depicted in FIG. 17B as the background diagram for the left turn accident, then the processing module 200 uses the responses to questions (24), (26) and (30) to establish the vehicle orientations:

24. Were you (LTV) traveling on the main road?
(24a) yes (24b) no (24c) unknown
30. Was the other vehicle (OV) traveling on the main road?
(30a) yes (30b) no (30c) unknown The processing module 200 places the left turning vehicle (LTV) in the lower quadrant of the diagram, preferably at an angle tilting left to indicate the turning motion, and places the other vehicle (OV) as follows:

If (24b)+(30a)+(26a), place OV as shown in FIG. 19A;
If (24b)+(30a)+(26b), place OV as shown in FIG. 19B;
If (24a)+(30a)+(26c) or (24b)+(30a)+(26c), place OV as shown in FIG. 19C;
If (24h)+(30a)+(26c) or (24a)+(30b)+(26c), no diagram.

The processing module 200 may also consider responses to questions (44), (21), (22), (25), (27), (28), (402) and (403) in completing the accident diagram:

44. Was the other vehicle traveling straight or making a turn?
(44a) straight (44b) making turn (44c) unknown
If turning, 110. Which way was the other vehicle turning?
(110b) left (110a) right
For all diagrams, if (44a), OV should be displayed as traveling straight.
For all diagrams, if (110b), OV should be displayed at a left angle—same as LTV.
For all diagrams, if (110a), OV should be displayed at an angle to the right.
21. How many lanes, in total, on your street?
(21a) 1 (21b) 2 (21c) 3 (21d) 4 (21e) 5 (21f) 6+
If (21c-f), 402. How many lanes on your side of the road?
(402a) 1 (402b) 2 (402c) 3 (402d) 4+(402e) unknown
If (402c-d), 22. Which lane did you turn from?
(22a) inside lane (22b) middle lane(s) (22c) outside lane
If (402e) and (22b), then 403. Which middle lane were you in?
(403a) right middle lane (403b) left middle lane
If more than 2 lanes on the roadway, then the processing module 200 depicts a solid centerline down middle of road and divided lines separating lanes in the accident diagram. Also, the processing module 200 determines the placement of the LTV in a lane on the LTV street.
25. How many lanes, in total, on the street you were turning onto?
(25a) 1 (25b) 2 (25c) 3 (25d) 4 (25e) 5 (250 6+(25g) unknown
27. How many lanes were there on the other vehicle's side of the road?
(27a) 1 (27b) 2 (27c) 3 (27d) 4+(27e) unknown
28. Which lane was the other vehicle in at the time of collision?
(28a) inside lane (28b) middle lane(s) (28c) outside lane (28d) breakdown lane (28e) over the center line (28f) unknown
If (27d) and (28b), then 404. Which middle lane was the other vehicle in?
(404a) right middle lane (404b) left middle lane It is appreciated that the processing module 200 determines the number of lanes on the OV street based on the answers or responses to questions (25) and (27) and determines the placement of the OV in a lane on the OV street based on the answers to questions (28) and (404).

58. Where was the initial point of contact on your vehicle?

| | |
|---|---|
| (58a) front end (center) | (58b) passenger-side front corner |
| (58c) driver-side front corner | (58d) passenger-side fender |
| (58e) driver-side fender | (58f) passenger-side middle |
| (58g) driver-side middle | (58h) passenger-side quarter |
| (58i) driver-side quarter | (58j) rear end |

60. Where was the initial point of contact on the other vehicle?

| | |
|---|---|
| (60a) front end (center) | (60b) passenger-side front corner |
| (60c) driver-side front corner | (60d) passenger-side fender |
| (60e) driver-side fender | (60f) passenger-side middle |
| (60g) driver-side middle | (60h) passenger-side quarter |
| (60i) driver-side quarter | (60j) rear end |
| (60k) unknown | |

Figure 20:
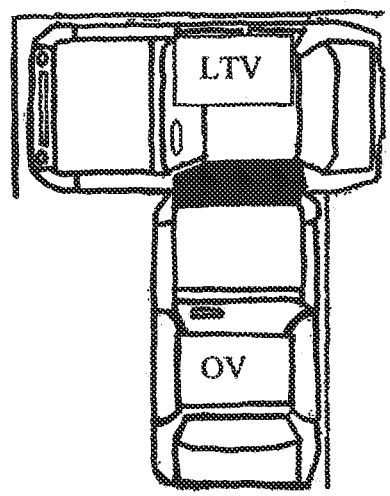
FIG. 20 is an exemplary vehicle diagrams illustrating the initial point of impact area.

For final placement of LTV and OV in the accident diagram, the processing module 200 pulls forward the vehicles in their respective lanes so that the shaded or highlighted portions of the vehicles in FIG. 20 are touching in the intersection. For example, the processing module 200 may display the front end of OV (60 a) impacting the LTV(58 g) on the middle of the driver side. It is appreciated that the processing module 200 may additionally display street names, other vehicles, traffic control icons, such as stop signs, traffic lights, speed limit signs, yield sign, one way sign, school zone sign, hidden driveway sign, etc., in the accident diagram to more fully capture the scene of the accident. Alternatively, the claims adjuster can operate the inventive system 100 to insert or click/drop other vehicle, street names and traffic control icons into the accident diagram to more fully capture the accident scene. Preferably, the adjuster can insert or click/drop arrow icon into the accident diagram to indicate direction before and after accident of each vehicle. The arrow can be color coded, e.g., blue arrow to match blue insured vehicle and red arrow to match red claimant vehicle. Additionally, the processing module 200 or the claims adjuster can add obstruction, e.g., fence, trees, snow bank, to the accident diagram to more fully capture the accident scene.

Once the insured interview is completed and the processing module 200 has determined a liability range of the insured, the processing module activates the arbitration module 160. If the claims adjuster selects to prepare an arbitration package, the arbitration module 160 requests the claims adjuster to select the appropriate arbitration forum, such as Automobile Subrogation Arbitration, Special Arbitration, etc. The Automobile Subrogation Arbitration handles the physical damage, personal injury protection and medical payment cases, and the Special Arbitration handles the bodily injury cases For example, if the claims adjuster selects the Automobile Subrogation Arbitration as the arbitration forum, then the arbitration module 160 determines if the claims adjuster is filing an answer (i.e., an arbitration package) as an applicant, respondent or both. The claims adjuster selects "Applicant" if claims adjuster is initiating the arbitration process by filing an arbitration claim (or contention) to recover money paid to the insured and the insured is referenced as the "Applicant" in the "contention" forms. Whereas, the claims adjuster selects "Respondent" if other insurance carrier has initiated the arbitration process by filing an arbitration claim (or contention) to recover money paid to their insured (i.e., the claimant) and the claims adjuster is filing a response to such request (i.e., arbitration claim) and the claims adjuster's insured is referenced as the "Respondent" in the contention forms.

The claims adjuster selects "both" if the other insurance carrier has initiated the arbitration process by filing an arbitration claim and the claims adjuster is filing a response to this claims as the Respondent, but also seeks to recover money paid to his/her insured in a counterclaim. If the claims adjuster selects "both," then the claims adjuster completes both Applicant and Respondent contentions.

However, if the claims adjuster selects the Special Arbitration as the arbitration forum, then the arbitration module 160 determines if the claims adjuster is filing an answer as "Company 1", "Company 2+" or both. The claims adjuster selects "Company 1" if claims adjuster is initiating the arbitration process by filing for an arbitration claim to recover money paid for bodily injury and the insured is referenced as the "Company 1" in the contention forms. Whereas, the claims adjuster selects "Company 2+" if another insurance carrier has initiated the arbitration process by filing for arbitration claim to recover money paid for bodily injury and the claims adjuster is filing a response to this request for reimbursement and the claims adjuster's insured is referenced as "Company X" in the contention forms, "X" being the company number assigned to claims adjuster in this arbitration action.

The claims adjuster selects "both" if another insurance carrier has initiated the arbitration process by filing for arbitration claim and the claims adjuster is a response to this request for reimbursement, but also seeks recover money paid to settle a bodily injury claim. If the claims adjuster selects "both," then the claims adjuster completes both "Company 1" and "Company 2+" contentions.

The arbitration module 160 then assists the claims adjuster in completing the contention forms. Preferably, the arbitration module 160 displays one section of the contention form at a time to the claims adjuster and the claims adjuster can add, delete or change any information on the form. Based on the information provided by the claims adjuster, the arbitration module 160 automatically completes section 1 of the contention form, such as selecting either Automobile Subrogation or Special Arbitration form, completing the Applicant, Respondent, Company 1 box, adding insurance company's name, name of insured, file or claim number, etc.

After completing section 1 of the contention form, the arbitration module 160 to proceeds to the "Affirmative Defenses" section. The arbitration module 160 advises/instructs the claims adjuster that the arbitration panel shall consider only those affirmative defenses or objections to jurisdiction included in the contentions section of the application and/or the contentions sheet. Also, the arbitration module 160 instructs the claims adjuster to review the claim file to determine if any of these defenses are applicable in this case. Also, the arbitration module 160 provides a help button or menu defining various terminology used in the form, such as "Affirmative Defense", "Objection", etc.

After completing the Affirmative Defenses section, the arbitration module 160 proceeds to the contention section. Contentions are brief statements summarizing allegations and defenses by a disputing party. That is, contentions are points the claims adjuster makes to support his/her case. The arbitration module 160 displays or provides hyperlink to the factors supporting the claims adjuster's assessment of liability, such as those factors shown in FIG. 10 affecting liability. The claims adjuster can select one or more displayed factors to incorporate them into the contention form and/or add other mitigating factors to support his/her assessment of liability.

In accordance with an embodiment of the present invention, the arbitration module 160 can automatically generate contention statements from the responses to the accident specific interviews. For example, if the insured is the left turning vehicle, the arbitration module 160 can generate the following contentions:

If filing as Applicant and the insured is the left turning vehicle (LTV), then the arbitration module 160 generates the following summary line: "Applicant was attempting to make a left turn."

If filing as Respondent and the insured is LTV, then the arbitration module 160 generates the following summary line: "Respondent was attempting to make a left turn."

If filing as Respondent and the insured is other vehicle (OV), then the arbitration module 160 generates the following summary line: "Applicant was attempting to make a left turn."

If filing as Applicant and the insured is OV, then the arbitration module 160 generates the following summary line: "Respondent was attempting to make a left turn."

The arbitration module 160 then adds an additional sentence to the generated summary line to form a paragraph representing a contention point based on responses to related questions of the accident specific interview. For example, if (44a) then the arbitration module 160 adds the following: "Respondent/Applicant was traveling straight"; if (110b), then the arbitration module 160 adds the following: "Respondent/Applicant was also attempting to make a left turn"; if (110a), then the arbitration module 160 adds the following: "Respondent/Applicant was attempting to make a right turn"; and the like.

The arbitration module 160 then generates additional contention points based on other factors, such as point of impact factors, mitigating factors, etc. For example, if the processing module 200 identified the insured as the left turning vehicle (LTV), then the arbitration module 160 searches answers to all interviews (insured, claimant, witness, police report, locus, appraisal (PRLA)) individually to identify any rule that applies a negative (−) weight and displays the text message associated with any such rule. The arbitration module 160 displays the text for each mitigating factors individually in a text box for the claims adjuster to utilize in completing the contention section of form. That is, the claims adjuster can highlight any of these mitigating points to include in the contentions.

However, if the processing module 200 identified the insured as the Other Vehicle (OV), then the arbitration module 160 searches answers to all interviews individually to identify any rule that applies a positive (+) weight and displays the corresponding text messages as separate bullet points for the claims adjuster to utilize in completing the contention section of the form.

After completing the contention section, the arbitration module 160 proceeds to the evidence section of the contention form. The arbitration module 160 instructs the claims adjuster to list all evidence which supports his/her contentions and provides a list of items (based on the interviews (questions/answers) analyzed/processed by processing module 200) the claims adjuster can select to include in the evidence section of the contention form. For example, 1. Accident Diagram
2. Statement of Applicant/Respondent (insured statement)
3. Statement of Applicant/Respondent (claimant statement if available on the system)
4. Statement of Witness (if completed)
5. Police Report (if PRLA completed)
6. Add Rules of the Road Excerpt
7. Add Supporting Case Law Excerpt If the claims adjuster clicks or selects the "Add Rules of the Road Excerpt" link, the arbitration module 160 displays the "Left Turn Rule of the Road" and the claims adjuster can highlight any portion of the left turn rule to include in the evidence section of the contention form. The highlight portion is then saved as part of the Arbitration package for this claim by the arbitration module 160.

If the claims adjuster clicks or selects the "Add Supporting Case Law Excerpt" link, the arbitration module 160 displays the various case laws relating to left turn and the claims adjuster can highlight any portion of the displayed case law to include in the evidence section of the contention form. The highlight portion is then saved as part of the Arbitration package for this claim by the arbitration module 160.

After completing the evidence section of the contention form, the arbitration module 160 proceeds to the damages section. The arbitration module 160 instructs the claims adjuster provide the arbitration panel member the amount of damages at issue. The Applicant should show the itemized arithmetic used to arrive at the amount claimed in the application.

After completing the damages section of the contention form, the arbitration module 160 proceeds to the remarks section. It is appreciated that the claims adjuster can stop and save the application/form and continue with the application/form at a later time, or go back to any previous section to edit/add/delete any information. The arbitration module 160 instructs the claims adjuster that this remarks section is optional and is used to provide information or comments that are deemed relevant but not necessary a contention, e.g., claims adjuster's opinion on liability or damages.

Upon completing the application/form, the claims adjuster can save the form/application, view or print the entire content of the arbitration package or each individual document of the arbitration package, such as the application, arbitration contentions, insured statements, accident diagram based on the insured statement, claimant statement, witness statement, rules of the road or motor vehicle statues, case law references, etc.

While the present invention has been particularly described with respect to the illustrated embodiment, it will be appreciated that various alterations, modifications and adaptations may be made on the present disclosure, and are intended to be within the scope of the present invention. For example, although various embodiments of the present invention have been described for assessing liability in a vehicle accident, it is appreciated that the present invention has applicability to any insurance claim involving comparative negligence. It is intended that the appended claims be interpreted as including the embodiment discussed above, those various alternatives, which have been described, and all equivalents thereto.

EXAMPLES

Example 1 – Descriptions of Loss

Insured's Description of Loss

- Occurred at night in an area that was not well-lit.
- Sleet/freezing rain made the visibility poor, but the insured did not have his wipers on. The insured did not know if the other vehicle's wipers were on.
- Both drivers had their headlights on.
- The road surface was icy, making for poor traction for both vehicles.
- The insured was not familiar with the area.
- The speed limit was 30 mph.
- The insured was traveling on a road that had one lane going each direction; the claimant was traveling on the intersecting street also with one lane in each direction.
- The claimant approached the intersection from the insured's left, on the main road.
- Both vehicles were traveling in the proper lanes.
- The insured's view of the other vehicle was obstructed by a snowbank.
- Neither of the vehicles had a stop sign or flashing caution lights.
- The insured stopped at the intersection, then pulled out to cross through the intersection at 10 mph.
- The insured crossed between ½ and 1 lane prior to being struck.
- The insured did not see the other vehicle prior to impact.
- The insured states the other vehicle was going 40 mph.
- The insured did not have a turn signal on prior to entering the intersection; he does not know if the claimant used a turn signal.
- Neither vehicle was passing any other traffic prior to the accident.
- The insured's driver-side fender was struck by the claimant's front-end center. Heavy damage was sustained by both vehicles.
- The insured swerved right in an attempt to avoid the accident; the claimant did nothing.
- The insured did not leave skid marks; He was unsure whether the claimant left skid marks.
- The insured did not feel either party was distracted during the accident.
- No one waved the insured out into the intersection.
- The police investigated the accident. The insured did not receive a citation; the insured was unsure if the claimant received one.

Claimant's description of Loss:

- Occurred at night. The claimant was unsure whether the area was well-lit.
- It was snowing but visibility was fine.
- The road surface was wet or click. The claimant did not know whether the insured's traction was poor.
- The claimant was traveling on the main road which had one lane going each direction; the insured was traveling on the intersecting street also with one lane in each direction.
- The insured approached the claimant from the right side.
- Both vehicles were traveling in the proper lanes.
- The claimant did not have a stop sign nor flashing caution lights; the claimant did not know whether the insured had a stop sign.
- The claimant did not know whether the insured stopped prior to pulling into the intersection.
- The insured crossed up to ½ a lane prior to being struck.
- The claimant could not estimate the distance between the two vehicles when (1) the claimant first saw the insured or (2) the insured pulled into the intersection.
- The claimant did not have a turn signal on prior to entering the intersection; he does not know if the insured used a turn signal on.
- Neither vehicle was passing any other traffic prior to the accident.
- The insured's driver-side middle was struck by the claimant's front end center. The insured's vehicle sustained moderate damage; the claimant's heavy damage.
- Neither vehicle left skid marks.
- The claimant was not distracted in the accident; not sure if the insured was distracted.
- The police investigated the accident. The claimant did not receive a warning or citation; the insured received a citation for Failure to Yield Right of Way.

Police Report

- The police report confirmed that the insured was cited for Failure to Yield Right of Way.

Insurance Investigator's Report

- The point of impact was the driver-side fender.
- The damage was heavy.

Example 2 - Initial Questions for Determining Accident Type (1) Was there a traffic light involved in this loss? (1a) yes (1b) no (2) What were you doing? (2a) turning left (2b) turning right (2c) travelling straight (2d) merging (2e) backing up (2f) other (3) If the answer to question (1) was (1b), did you have a stop sign? (3a) yes (3b) no (4) What was the other vehicle doing? (4a) turning left (4b) turning right (4c) travelling straight (4d) merging (4e) backing up (4f) other (5) If the answer to question (1) was (1b), did the other vehicle have a stop sign? (5a) yes (5b) no (6) Before accident, were both vehicles travelling in same direction? (6a) yes (6b) no (7) If the answer to question (3) was (3b), was your vehicle on the main road? (7a) yes (7b) no (8) If the answer to question (5) was (5b), was the other vehicle on the main road? (8a) yes (8b) no

Example 3 - Summary of Preliminary Response Used to Determine Accident Type

| Question | Insured | Claimant |
|----------|---------|----------|
| 1 | b | b |
| 2 | c | c |
| 3 | b | b |
| 4 | c | c |
| 5 | b | b |
| 6 | b | b |
| 7 | b | b |
| 8 | a | b |

Example 4 – Sample Preliminary Business Rules

Sample business rule resulting in determination of "left turn" accident type:
If (1b) + (3a) + (2a) + (4c) + (5b) + (6b) then Accident 1.
If Insured calls first then proceed to "Left Turning" vehicle interview.
If Claimant calls first then proceed to "Other" vehicle interview.
If Witness calls + (2a) then proceed to "Witness" interview(s), and Insured gets "Left Turning" vehicle interview and Claimant gets "Other" vehicle interview.

Sample business rule resulting in determination of "pulling out" accident type:
If (1b) + (3b) + (7b) + (2c) + (4c) + (5b) + (8a) + (6b) then Accident 2.
If Insured calls first then proceed to "Pulling Out" vehicle interview.
If Claimant calls first then proceed to "Other" vehicle interview.
If Witness calls + (2c) then proceed to "Witness" interview(s) and Insured gets "Pulling Out" vehicle interview and Claimant gets "Other" vehicle interview.

Sample business rule resulting in determination of "right turn" accident type:
If (1b) + (3a) + (2d) + (4b) + (5a) + (6b) then Accident 3.
If Insured calls first then proceed to "Other" vehicle interview.
If Claimant calls first then proceed to "Right Turning" vehicle interview.
If Witness + (2d) then proceed to "Witness" interview(s) and Insured gets "Other" vehicle interview and Claimant gets "Right Turning" vehicle interview.

Sample business rule resulting in determination of "traffic light" accident type:
If (1b) + (3a) + (2d) + (4b) + (5b) + (6a) then display "Not Eligible Alert Message." If (1a) +   (2b) + (4f) + (6b) then Accident 4.
If first person to call is either the Insured or the Claimant, the proceed to "Car A" interview. If Witness is first person to call, then proceed to "Witness" interview(s), and Insured gets "Car A" interview and Claimant gets "Car B" interview.

Sample business rule resulting in determination of "lane change" accident type:
If (1a) + (2b) + (4f) + (6a) then Accident 5.
If first person to call is either Insured or Claimant, proceed to "Car A" interview.
If Witness is first person to call, then proceed to "Witness" interview(s), and Insured gets "Car A" interview and Claimant gets "Car B" interview.

Example 5 - "Pulling Out" Interview (8)   Did accident occur during daylight? (8a) yes (8b) no ↪If no, (119) was the accident area well lit? (119a) yes (119b) no (119c) unknown

(11)   What were the weather conditions? (11a) clear (11b) precipitation

↪If precipitation, check off as many as apply: rain, fog snow, sleet/freezing rain, hail, other precipitation.

↪(105) Did the weather affect visibility? (105b) yes (105a) no

↪If yes, (13) were your wipers on? (13a) yes (13b) no

↪If yes, (15) were the other vehicle's wipers on? (15a) yes (15b) no (15c) unknown ↪If clear, and daylight, (108) Did sun glare affect your vision? (108a) yes (108b) no ↪If clear and not daylight, or if precipitation, (9) Were your headlights on? (9a) yes (9b) no ↪ If clear and not daylight, or if precipitation, (10) Were the other vehicle's headlights on? (10a) yes (10b) no (10c) unknown

(20) Are you familiar with the area? (20a) yes (20b) no

(21) How many lanes, in total, on your street? (21a) 1 (21b) 2 (21c) 3 (21d) 4 (21e) 5 (21f) 6+

(22) Which lane were you in at the time of collision?
(22a) inside lane (22b) middle lane(s) (22c) outside lane (22e) over the center line (22f) breakdown lane

(23) Was this the proper lane to pull from? (23a) yes (23b) no (23c) unknown

(24) Were you traveling on the main road? (24a) yes (24b) no (24c) unknown

(25) How many lanes, in total, on the street you were crossing?
(25a) 1 (25b) 2 (25c) 3 (25d) 4 (25e) 5 (25f) 6+ (25g) unknown

(26) Before the accident, where was the other vehicle coming from?
(26a) from your left (26b) from your right (26d) unknown

(27) How many lanes were there on the other vehicle's side of the road?
(27a) 1 (27b) 2 (27c) 3 (27d) 4+ (27e) unknown

(28) Which lane was the other vehicle in at the time of collision?
(28a) inside lane (28b) middle lane(s) (28c) outside lane (28d) breakdown lane (28f) over the center line (28e) unknown

(29) Was the other vehicle in the proper lane for where it was going? (29a) yes (29b) no (29c) unknown

(30) Was the other vehicle traveling on the main road? (30a) yes (30b) no (30c) unknown

(31) From your perspective in the driver's seat, how many lanes had you crossed at time of impact?
(31a) up to ½ (31b) ½ - 1 (31c) 1 – 1½ (31d) 1½ - 2 (31e) 2 – 3 (31f) 3 – 4 (31g) 4 – 5 (31h) 5+

(18) Describe the road surface. (SELECT ALL THAT APPLY)
(18a) dry and clear (18b) wet or slick (18c) snow (18d) ice (18e) sanded (18f) debris (18g) potholes ↪ If (18b-g), (106) How was your vehicle's traction? (106a) good (106b) poor ↳(107) Do you have any reason to believe the other vehicle's traction was poor?

(107b) yes (107a) no (107c) unknown

(34) What is the posted speed limit on the main road? (34a) (FILL IN SPEED) (34b) unknown

(36) Was there anything blocking your view of the other vehicle? (36a) yes (36b) no
↳If yes, (37) What? (37a) (FILL-IN)

(41) How many car lengths were there between your vehicle and the other vehicle when you first saw it?
(41e) did not see other vehicle (41a) 1 (41b) 2-3 (41c) 4-5 (41d) more than 5 (41f) distance unknown ↳If no (41e), (42) How many car lengths were there between your vehicle and the other vehicle when you began to pull out? (42a) 1 (42b) 2-3 (42c) 4-5 (42d) more than 5 (42e) distance unknown

(77) How fast were you going before the accident? (77a) (FILL IN SPEED)

(43) How fast was the other vehicle going before the accident? (43a) (FILL IN SPEED) (43b) unknown

(50) Did the other vehicle have its turn signal on before the accident? (49a) yes (49b) no (49c) unknown
↳If yes, (50) Was the other vehicle's turn signal on when it should not have been? (50b) yes (50a) no (50c) unknown (111) Did the other vehicle have a stop sign? (111a) yes (111b) no (111c) unknown
↳If yes, (122) Did the other vehicle also have a red flashing light?
(122a) yes (122b) no (122c) unknown
↳If no, (123) Did the other vehicle have a yellow flashing light?
(123a) yes (123b) no (123c) unknown

(45) Did the other vehicle stop before entering the intersection? (45a) yes (45b) no (45c) unknown (112) Did you have a stop sign? (112a) yes (112b) no
↳If yes, (120) Did you also have a red flashing light? (120a) yes (120b) no (120c) unknown
↳If no, (121) Did you have a yellow flashing light? (121a) yes (121b) no (121c) unknown

(51) Did you stop before entering the intersection? (51a) yes (51b) no

(53) Did you use your turn signal? (53a) yes (53b) no (53c) unknown
↪If yes, (129) Was your turn signal on when it should not have been? (129b) yes (129a) no (130) Were you passing any stopped or moving vehicles in traffic? (130a) yes (130b) no (130c) unknown
↪If yes, (131) Were you passing to the left or right of the traffic? (131a) to the left (131b) to the right
↪(132) Was your passing proper? (132a) yes (132b) no

(55) Was the other vehicle passing any stopped or moving vehicles in traffic? (55a) yes (55b) no (55c) unknown
↪If yes, (56) Was the other vehicle passing to the left or right of the traffic? (56b) left (56a) right
↪(102) Was the passing proper? (102a) yes (102b) no

(58) Where was the initial point of contact on your vehicle? (58a) front end (center) (58b) passenger-side front corner
(58c) driver-side front corner (58d) passenger-side fender (58e) driver-side fender (58f) passenger-side middle
(58g) driver-side middle (58h) passenger-side quarter (58i) driver-side quarter (58j) rear end

(59) How badly was your vehicle damaged? (59a) none/minor (59b) moderate (59c) heavy

(60) Where was the initial point of contact on the other vehicle? (60a) front end (center) (60b) passenger-side front corner (60c) driver-side front corner (60d) passenger-side fender (60e) driver-side fender (60f) passenger-side middle (60g) driver-side middle (60h) passenger-side quarter (60i) driver-side quarter (60j) rear end
(60k) unknown

(61) How badly was the other vehicle damaged? (61a) none/minor (61b) moderate (61c) heavy (61d) unknown

(62) What, if anything, did you do to avoid the accident? (SELECT ALL THAT APPLY) (62a) none (62b) braked (62c) swerved left (62d) swerved right (62e) horn (62g) accelerated

(64) What, if anything, did the other vehicle do to avoid the accident? (SELECT ALL THAT APPLY) (64a) none (64b) braked (64c) swerved left (64d) swerved right (64e) horn (64f) unknown (64g) accelerated

(68) Did you leave skid marks? (68a) yes (68b) no
    ↪ If yes, (199) How long were they? (199a) (FILL IN LENGTH IN FEET)

(66) Did the other vehicle leave skid marks? (66a) yes (66b) no (66c) unknown
    ↪ If yes, (67) How long were they? (67a) (FILL IN LENGTH IN FEET)

(72) Were you distracted prior to the accident? (72a) yes (72b) no
    ↪ If yes, (73) What distracted you? (SELECT ALL THAT APPLY)
(73a) cellular phone
(73b) children/passengers (73c) adjusting radio/mirror/vehicle controls
(73d) looking elsewhere
    (73e) other

(74) Do you have any reason to believe the other driver was distracted prior to the accident? (74a) yes (74b) no (74c) unknown ↪ If yes, (75) What distracted him/her? (SELECT ALL THAT APPLY) (75a) cellular phone (75b) children/passengers (75c) adjusting radio/mirror/vehicle controls (75d) looking elsewhere (75e) other

(76) Did any other person indicate the way was clear for you to pull out? (76a) yes (76b) no

(78) Did the police arrive on scene AND take a report? (78a) yes (78b) no
    ↪ If yes, (79) Did police issue you a citation or warning? (79a) citation (79b) warning (79c) neither
        ↪ If (79a) or (79)b), (80) What type? (SELECT ALL THAT APPLY) (80a) failure to yield
        (80b) failure to use caution (80j) disregard stop sign (80c) improper turning (80d) speeding
        (80e) leaving the scene (80f) failure to use proper equipment (80g) suspended or revoked license (80h) (FILL IN OTHER)
    ↪ If (79a), (81) What is the status of the citation?
    (81a) citation overturned/dismissed (81b) paid fine or will be paying fine (81c) fighting citation

(82) Did police issue the other driver a citation or warning? (82a) citation (82b) warning (82c) neither (82d) unknown
    ↪ If (82a) or (82b), what type? (SELECT ALL THAT APPLY) (83a) failure to yield (83b) failure to use caution (83k) disregard stop sign (83c) improper turning (83j) improper passing (83d) speeding
    (83e) leaving the scene (83f) failure to use proper equipment (83g) suspended or revoked license
    (83h) FILL IN OTHER  (83i) unknown

Example 6 - "Other" Vehicle Interview in a "Pulling Out" Accident

(8)      Did accident occur during daylight? (8a) yes  (8b) no
↪If no, (119) was the accident area well lit? (119a) yes  (119b) no  (119c) unknown

(11)     What were the weather conditions? (11a) clear  (11b) precipitation
↪If precipitation, check off as many as apply: rain, fog snow, sleet/freezing rain, hail, other precipitation.
        ↪(105) Did the weather affect visibility? (105b) yes (105a) no
        ↪If yes, (15) Were your wipers on? (15a) yes  (15b) no
        ↪If yes, (13) Were the other vehicle's wipers on? (13a) yes  (13b) no (13c) unknown
↪If clear, and daylight, (108) Did sun glare affect your vision? (108a) yes (108b) no↪If not daylight, or if precipitation, (10) Were your headlights on? (10a) yes  (10b) no  (10c) unknown
↪If not daylight, or if precipitation, (9) Were the other vehicle's headlights on? (9a) yes  (9b) no

(20)     Are you familiar with the area? (20a) yes  (20b) no

(27)     How many lanes were there on your side of the road? (27a) 1  (27b) 2  (27c) 3  (27d) 4+

(28)     Which lane were you in at the time of collision? (28a) inside lane  (28b) middle lane(s)  (28c) outside lane
(28d) breakdown lane  (28f) over the center line

(29)     Were you in the proper lane for where it was going? (29a) yes  (29b) no  (29c) unknown

(30)     Were you traveling on the main road? (30a) yes  (30b) no  (30c) unknown

(25)     How many lanes, in total, on the street the other vehicle was turning onto?
(25a) 1  (25b) 2  (25c) 3  (25d) 4  (25e) 5  (25f) 6+  (25g) unknown

(26)     Before the accident, where was the other vehicle coming from? (26a) from your right  (26b) from your left

(21)     How many lanes, in total, on the other vehicle's street?
(21a) 1  (21b) 2  (21c) 3  (21d) 4  (21e) 5  (21f) 6+  (21g) unknown

(22) Which lane was the other vehicle in at the time of collision? (22a) inside lane (22b) middle lane(s) (22c) outside lane (22d) unknown (22e) over the center line (22f) breakdown lane

(23) Was this the proper lane for the other vehicle to pull from? (23a) yes (23b) no (23c) unknown

(24) Was the other vehicle traveling on the main road? (24a) yes (24b) no (24c) unknown

(31) How many lanes had the other vehicle's front end crossed at impact?
(31a) up to ½ (31b) ½ - 1 (31c) 1 – 1½ (31d) 1½ - 2 (31e) 2 – 3 (31f) 3 – 4 (31g) 4 – 5 (31h) 5+

(18) Describe the road surface. (SELECT ALL THAT APPLY) (18a) dry and clear (18b) wet or slick (18c) snow (18d) ice (18e) sanded (18f) debris (18g) potholes
↪(107) How was your vehicle's traction? (107a) good (107b) poor
↪(106) Do you have any reason to believe the other vehicle's traction was poor? (106b) yes (106a) no (106c) unknown

(34) What is the posted speed limit on the main road? (34a) (FILL IN SPEED) (34b) unknown

(36) Was there anything blocking your view of the other vehicle? (36a) yes (36b) no
↪If yes, (37) What? (37a) (FILL-IN)

(41) How many car lengths were there between your vehicle and the other vehicle when you first saw it?
(41e) did not see other vehicle (41a) 1 (41b) 2-3 (41c) 4-5 (41d) more than 5 (41f) distance unknown
↪If no (41e), (42) How many car lengths were there between your vehicle and the other vehicle when you began to pull out? (42a) 1 (42b) 2-3 (42c) 4-5 (42d) more than 5 (42e) distance unknown

(77) How fast was the other vehicle going before the accident? (77a) (FILL IN SPEED)

(43) How fast were you going before the accident? (43a) (FILL IN SPEED)

(49) Was your turn signal on before the accident? (49a) yes (49b) no (49c) unknown
↪If yes, (50) Was your turn signal on when it should not have been? (50b) yes (50a) no (50c) unknown (111) Did you have a stop sign? (111a) yes (111b) no (111c) unknown
↳If yes, (122) Did you also have a red flashing light? (122a) yes (122b) no (122c) unknown
↳If no, (123) Did you have a yellow flashing light? (123a) yes (123b) no (123c) unknown

(45) Did you stop before entering the intersection? (45a) yes (45b) no (112) Did the other vehicle have a stop sign? (112a) yes (112b) no (112c) unknown
↳If yes, (120) Did the other vehicle also have a red flashing light? (120a) yes (120b) no (120c) unknown
↳If no, (121) Did the other vehicle have a yellow flashing light? (121a) yes (121b) no (121c) unknown

(51) Did the other vehicle stop before entering the intersection? (51a) yes (51b) no (51c) unknown

(53) Did the other vehicle use its turn signal? (53a) yes (53b) no (53c) unknown
↳If yes, (129) Was other vehicle's turn signal on when it should not have been? (129b) yes (129a) no (130) Was the other vehicle passing any stopped or moving vehicles in traffic? (130a) yes (130b) no (130c) unknown
↳If yes, (131) Was the other vehicle passing to the left or right of the traffic? (131a) left (131b) right
↳(132) Was your passing proper? (132a) yes (132b) no

(55) Were you passing any stopped or moving vehicles in traffic? (55a) yes (55b) no
↳If yes, (56) Were you passing to the left or right of the traffic? (56b) left (56a) right
↳(102) Was your passing proper? (102a) yes (102b) no

(60) Where was the initial point of contact on your vehicle? (60a) front end (center) (60b) passenger-side front corner (60c) driver-side front corner (60d) passenger-side fender (60e) driver-side fender (60f) passenger-side middle (60g) driver-side middle (60h) passenger-side quarter (60i) driver-side quarter (60j) rear end (60k) unknown

(61) How badly was the other vehicle damaged? (61a) none/minor (61b) moderate (61c) heavy

(58) Where was the initial point of contact on the other vehicle? (58a) front end (center) (58b) passenger-side front corner (58c) driver-side front corner (58d) passenger-side fender (58e) driver-side fender (58f) passenger-side middle (58g) driver-side middle (58h) passenger-side quarter (58i) driver-side quarter (58j) rear end

(59) How badly was the other vehicle damaged? (59a) none/minor (59b) moderate (59c) heavy (59d) unknown

(64) What, if anything, did you do to avoid the accident? (SELECT ALL THAT APPLY) (64a) none (64b) braked (64c) swerved left (64d) swerved right (64e) horn (64g) accelerated

(62) What, if anything, did the other vehicle do to avoid the accident? (SELECT ALL THAT APPLY) (62a) none (62b) braked (62c) swerved left (62d) swerved right (62e) horn (62f) unknown (62g) accelerated

(66) Did you leave skid marks? (66a) yes (66b) no (66c) unknown
↪If yes, (67) How long were they? (67a) (FILL IN LENGTH IN FEET)

(68) Did the other vehicle leave skid marks? (68a) yes (68b) no (68c) unknown
↪If yes, (199) How long were they? (199a) (FILL IN LENGTH IN FEET)

(74) Were you distracted prior to the accident? (74a) yes (74b) no
↪If yes, (75) What distracted you? (SELECT ALL THAT APPLY) (75a) cellular phone
(75b) children/passengers (75c) adjusting radio/mirror/vehicle controls (75d) looking elsewhere
(75e) other

(72) Do you have any reason to believe the other driver was distracted prior to the accident?
(72a) yes (72b) no (72c) unknown
↪If yes, (73) What distracted him/her? (SELECT ALL THAT APPLY) (73a) cellular phone (73b) children/passengers (73c) adjusting radio/mirror/vehicle controls (73d) looking elsewhere (73e) other

(78) Did the police arrive on scene AND take a report? (78a) yes (78b) no

(82) Did police issue you a citation or warning? (82a) citation (82b) warning (82c) neither
↪If (82a) or (82b), (83) What type? (SELECT ALL THAT APPLY)
(83a) failure to yield (83b) failure to use caution (83k) disregard stop sign (83c) improper turning
(83j) improper passing (83d) speeding (83e) leaving the scene (83f) failure to use proper equipment
(83g) suspended or revoked license (83h) FILL IN OTHER ↪If (82a), (84) What is the status of the citation?
(84a) citation overturned/dismissed (84b) paid fine or will be paying fine (84c) fighting citation

(79) Did police issue the other vehicle a citation or warning? (79a) citation (79b) warning (79c) neither (79d) unknown
↪If (79a) or (79b), (80) What type? (SELECT ALL THAT APPLY)
(80a) failure to yield (80b) failure to use caution (80j) disregard stop sign (80c) improper turning
(80d) speeding (80e) leaving the scene (80f) failure to use proper equipment (80g) suspended or revoked license (80h) ( FILL IN OTHER) (80I) unknown

Example 7 - "Witness" Interview in a "Pulling Out" Accident

(86) Are you related to or acquainted with any party involved in this accident? (86a) yes (86b) no
↪If yes, (87) Who are you acquainted with? (87a) (FILL IN)

(8) Did accident occur during daylight? (8a) yes (8b) no

(11) What were the weather conditions? (11a) clear (11b) precipitation
↪If precipitation, check off as many as apply: rain, fog snow, sleet/freezing rain, hail, other precipitation.

(105) Did the weather affect visibility? (105b) yes (105a) no
↪If yes, (13) Were party A's wipers on? (13a) yes (13b) no (13c) unknown
↪If yes, (15) Were party B's wipers on? (15a) yes (15b) no (15c) unknown
↪If (8b) OR (11b), (9) Were party A's headlights on? (9a) yes (9b) no (9c) unknown
↪If (8b) OR (11b), (10) Were party B's headlights on? (10a) yes (10b) no (10c) unknown

(27) How many lanes were there on party B's side of the road? (27a) 1 (27b) 2 (27c) 3 (27d) 4+ (27e) unknown

(28) Which lane was party B in at the time of collision? (28a) inside lane (28b) middle lane(s) (28c) outside lane (28d) breakdown lane (28f) over the center line (28e) unknown

(29) Was party B in the proper lane? (29a) yes (29b) no (29c) unknown

(23) Did party A turn from the proper lane? (23a) yes (23b) no (23c) unknown

(34) What was the posted speed limit on the main road? (34a) (FILL IN SPEED) (34b) unknown

(88) Was there anything blocking your view of the accident? (88a) yes (88b) no

(36) Were you aware of anything which might have blocked each driver's view of the other? (36a) yes (36b) no
↪If yes, (37) What? (37a) (FILL IN)

(53) Did party A use its turn signal? (53a) yes (53b) no (53c) unknown
↪If yes, (90) Was party A's turn signal activated an appropriate distance from its turn?
(90a) yes (90b) no (90c) unknown
↪If no, (91) Please elaborate (91a) (Fill IN)

(51) Did party A stop before turning? (51a) yes (51b) no (51c) unknown (112) Did party A have a stop sign? (112a) yes (112b) no (112c) unknown

(85) Did party A make its turn too wide or too short? (85a) yes (85b) no (85c) unknown (130) Was party A passing any stopped or moving vehicles in traffic? (130a) yes (130b) no (130c) unknown
↪If yes, (132) Was A's passing proper? (132a) yes (132b) no

(49) Did party B use its turn signal? (49a) yes (49b) no (49c) unknown
↪If yes, (50) Was party B's turn signal on when it should not have been? (50b) yes (50a) no (50c) unknown

(44) Did you see whether party B was traveling straight or making a turn? (44a) straight (44b) making turn (44c) unknown
↪If turning, (110) Which way was party B turning? (110b) left (110a) right

(47) Did party B make its turn too wide or too short? (47a) yes (47b) no (47c) unknown
↪If party B was NOT on the main road, (45) Did party B stop before turning or pulling out?
(45a) yes (45b) no (45c) unknown (45d) party B was on the main road

(55) Was party B passing any stopped or moving vehicles in traffic? (55a) yes (55b) no (55c) unknown
↪(102) If yes, was party B's passing proper? (102a) yes (102b) no (111) Did party B have a stop sign? (111a) yes (111b) no (111c) unknown

(42) How many car lengths were there between party A and party B when party A began turning? (42e) did not see (42a) 1 (42b) 2-3 (42c) 4-5 (42d) more than 5 (42f) distance unknown

(62) What, if anything, did party A do to avoid the accident? (62a) nothing (62b) braked (62c) swerved left (62d) swerved right (62e) horn (62g) accelerated (62f) unknown

(64) What, if anything, did party B do to avoid the accident? (64a) nothing (64b) braked (64c) swerved left (64d) swerved right (64e) horn (64g) accelerated (64f) unknown

(66) Did party B leave any skid marks? (66a) yes (66b) no (66c) unknown
↪(67) If yes, how long were they? (67a) (FILL IN LENGTH IN FEET)

(92) In your opinion, was party A traveling at a speed greater than reasonable given existing conditions? (92a) yes (92b) no (92c) unknown
↪(77) If yes, how fast was A traveling? (77a) (FILL IN SPEED)

(93) In your opinion, was party B traveling at a speed greater than reasonable given existing conditions? (93a) yes (93b) no (93c) unknown
↪(43) If yes, how fast was party B traveling? (43a) (FILL IN SPEED)

(94) In your opinion, did party A enter the intersection with appropriate caution? (94a) yes (94b) no
↪(103) If no, please explain. (103a) (FILL IN)

(95) In your opinion, did party B enter the intersection with appropriate caution? (95a) yes (95b) no
↪(104) If no, please explain. (104a) (FILL IN)

(96) Did you overhear either operator admit fault at the scene? (96a) yes (96b) no
↪If yes, (97) Who admitted fault? (SELECT ALL THAT APPLY)
(97a) party A (97b) party B

(98) Did you speak to a police officer about the accident? (98a) yes (98b) no (98c) no police at scene
↪If no, (1) Why didn't you speak to a police officer? (1a) (FILL IN)

Example 8 – Issues Possibly Addressed in Police Report, Scene Locus or Vehicle Appraisal

(26) Before the accident, where was party B coming from? (26a) from party A's left (26b) from party A's right (26c) from opposite direction

(34) What is the posted speed limit on the main road? (34a) (FILL IN SPEED)

(99) Were there any signs prohibiting party A's left turn? (99b) yes (99a) no

(21) How many lanes, in total, on party A's street? (21a) 1 (21b) 2 (21c) 3 (21d) 4 (21e) 5 (21f) 6+

(22) Which lane did party A turn from? (22a) inside lane (22b) middle lane(s) (22c) outside lane

(23) Did party A turn from the proper lane? (23a) yes (23b) no

(24) Was party A traveling on the main road? (24a) yes (24b) no

(25) How many lanes, in total, on the street party A was turning onto? (25a) 1 (25b) 2 (25c) 3 (25d) 4 (25e) 5 (25f) 6+

(27) How many lanes were there on party B's side of the road? (27a) 1 (27b) 2 (27c) 3 (27d) 4+

(28) Which lane was party B in at time of collision? (28a) inside lane (28b) middle lane(s) (28c) outside lane (28d) breakdown lane (28f) over the center line

(29) Is this the proper lane for where party B was going? (29a) yes (29b) no

(30) Was party B traveling on the main road? (30a) yes (30b) no (100) Were there any signs prohibiting party B's turn? (100b) yes (100a) no (112) Did party A have a stop sign? (112a) yes (112b) no (120) Did party A have a flashing red light? (120a) yes (120b) no (121) Did party A have a flashing yellow light? (121a) yes (121b) no (111) Did party B have a stop sign? (111a) yes (111b) no (122) Did party B have a flashing red light? (122a) yes (122b) no (123) Did party B have a flashing yellow light? (123a) yes (123b) no

(44) Was party B traveling straight or making a turn? (44a) straight (44b) making turn (110) Which way was party B turning? (110b) left (110a) right

(67) How long were party B's skid marks? (67a) (FILL IN LENGTH IN FEET)

(79) Did police issue a citation or warning? (79a) citation (79b) warning (79c) neither

(80) What citation or warning did A receive? (SELECT ALL THAT APPLY)
(80a) failure to yield (80b) failure to use caution (80c) improper turning (80d) speeding (80e) leaving the scene (80f) failure to use proper equipment (80g) suspended or revoked license (80j) disregard stop sign
(80h) other (FILL IN)

(82) Did police issue party B a citation or warning? (82a) citation (82b) warning (82c) neither

(83) What citation or warning did party B receive? (SELECT ALL THAT APPLY)
(83a) failure to yield (83b) failure to use caution (83c) improper turning (83d) speeding (83e) leaving the scene (83f) failure to use proper equipment (83g) suspended or revoked license (83j) improper passing (83k) disregard stop sign (83h) other (FILL IN)

(58) Where was the initial point of contact on party A's vehicle?
(58a) front end (center) (58b) passenger-side corner (58c) driver-side front corner (58d) passenger-side fender (58e) driver-side fender (58f) passenger-side middle (58g)driver-side middle (58h) passenger-side right quarter (58i) driver-side quarter (58j) rear end

(59) How badly was party A's vehicle damaged? (59a) none/minor (59b) moderate (59c) heavy

(60) Where was the initial point of contact on party B's vehicle?
(60a) front end (center) (60b) passenger-side right front corner (60c) driver-side front corner (60d) passenger-side right fender (60e) driver-side fender (60f) passenger-side right middle (60g) driver-side middle (60h) passenger-side right quarter (60i) driver-side quarter (60j) rear end

(61) How badly was party B's vehicle damaged? (61a) none/minor (61b) moderate (61c) heavy

Example 9 – Table Summarizing Responses in "Pulling Out" Accident

| Question Number | Insured's Response | Claimant's Response | Police Report or Investigator's Assessment |
|---|---|---|---|
| 8 | B | B | |
| 10 | A | | |
| 11 | B | B | |
| 13 | B | | |
| 15 | C | | |
| 18 | D | B | |
| 20 | B | | |
| 21 | B | B | |
| 23 | A | A | |
| 24 | B | B | |
| 25 | B | b | |
| 26 | A | A | |
| 29 | A | A | |
| 30 | A | a | |
| 31 | B | a | |
| 34 | (30 mph) | | |
| 36 | A | | |
| 37 | (snow bank) | | |
| 41 | E | F | |
| 42 | | E | |
| 43 | (40 mph) | | |
| 45 | B | | |
| 49 | c | b | |
| 51 | a | c | |
| 53 | b | c | |
| 55 | b | b | |
| 58 | e | g | e |
| 59 | c | b | c |
| 60 | a | a | |
| 61 | c | c | |
| 62 | d | | |
| 64 | a | | |
| 66 | c | b | |
| 68 | b | b | |
| 72 | b | b | |
| 74 | b | b | |
| 76 | b | | |
| 77 | (10 mph) | | |
| 78 | a | a | |
| 79 | c | a | a |
| 80 | | a | |
| 82 | d | c | |
| 105 | b | a | |
| 106 | b | c | |
| 107 | b | | |
| 111 | b | | |
| 112 | b | c | |
| 119 | b | c | |
| 121 | b | | |
| 123 | b | b | |
| 130 | B | b | |

Example 10 – Point of Impact Chart

Vehicle A →

| 26a 24b/30a No 64c or d No 111a | 58A Front Bumper | 58B Right Front Corner | 58C Left Front Corner | 58D Right Fender | 58E Left Fender | 58F Right Middle | 58G Left Middle | 58H Right Quarter | 58I Left Quarter | 58J Rear End |
|---|---|---|---|---|---|---|---|---|---|---|
| 60A Front Bumper | 100 | 100 | 100 | X | 95 | X | 80 | X | 65 | 50 |
| 60B Right Front Corner | 100 | 100 | 100 | X | 95 | X | 80 | X | 65 | 50 |
| 60C Left Front Corner | X | X | 90 | X | 85 | X | 70 | X | 55 | 40 |
| 60D Right Fender | 100 | 100 | 100 | X | 100 | X | 80 | X | X | 50 |
| 60E Left Fender | X | X | 90 | X | 85 | X | X | X | 40 | 40 |
| 60F Right Middle | 100 | 100 | 100 | X | X | X | X | X | X | X |
| 60G Left Middle | X | X | X | X | X | X | X | X | X | X |
| 60H Right Quarter | 100 | 100 | 100 | X | X | X | X | X | X | X |
| 60I Left Quarter | X | X | X | X | X | X | X | X | X | X |
| 60J Rear End | 100 | 100 | 100 | 100 | X | 100 | X | 100 | X | 100 |

What is claimed:

1. A computer-based method for determining comparative negligence of parties involved in an accident comprising the steps of:
    presenting at least one preliminary question about the accident;
    receiving responses to the at least one preliminary question;
    determining, via one or more program controlled processors, an accident type by applying a set of preliminary rules to the responses to the at least one preliminary question;
    selecting, via one or more processors, at least one inquiry relevant to the determined accident type;
    receiving responses from one or more parties to the accident or bystander witnesses to said at least one inquiry;
    determining, via one or more processors, degree of comparative negligence of one or more parties involved in the accident by applying accident rules for said accident type to said responses to said at least one inquiry; and
    using the determined comparative negligence to adjust a claimant's damages;
    wherein any of the one or more processors are the same or different.

2. The computer-based method of claim 1, wherein the responses to the at least one preliminary question is received from any of one or more parties to the accident, a bystander witness, or an insurance representative.

3. The computer-based method of claim 1, further comprising the step of determining whether conflicting responses to the at least one preliminary question has been received.

4. The computer-based method of claim 3, further comprising the step of alerting an insurance representative of any conflicting responses to any of the at least one preliminary questions has been received.

5. The computer-based method of claim 3, if it is determined that there is a conflicting response to any of the at least one preliminary questions, further comprising the step of resolving said conflicting response with information relating to said accident received from one or more bystander witness, a police report, or scene locus.

6. The computer-based method of claim 1, wherein said at least one preliminary question relates to at least one of the following:
    traffic light involvement, stop sign involvement, location with respect to the road of claimant's vehicle and/or other vehicles involved, direction of travel of claimant's vehicle with respect to other vehicles involved, and actions of the claimant's vehicle and/or other vehicles involved, including: turning left, turning right, traveling straight, merging, and/or backing up.

7. The computer-based method of claim 1, wherein said accident rules relate to at least one of: point of impact factors, line of sight factors, speed factors, evasive action factors, and compliance with traffic regulation factors.

8. The computer-based method of claim 1, further comprising the step of presenting a follow-up inquiry to said at least one inquiry, based on said responses received to said at least one inquiry.

9. The computer-based method of claim 1, further comprising the step of generating a report summarizing details of said loss, said report including at least one of the following details: recommended liability range, factors affecting liability and statements of said claimant.

10. The computer-based method of claim 1, further comprising the step of generating a settlement report based on at least one of the following: claims office, state, date range and claims adjuster.

11. The computer-based method of claim 1, further comprising the step of using the determined comparative negligence to diminish said one or more parties' damages.

12. A system for determining comparative negligence of one or more parties involved in an accident comprising:
    one or more computer processors programmed:
        present at least one preliminary question about the accident;
        receive a response to the at least one preliminary question; and
        apply a set of preliminary rules to the responses to the at least one preliminary question to determine accident type;
    one or more computer processors programmed to:
        present at least one inquiry based on said accident type;
        receive responses to said at least one inquiry;
        determine degree of comparative negligence of one or more parties involved in accident based on said responses; and
        use the determined degree of comparative negligence to adjust a claimant's damages;
    wherein the one or more processors are the same or different.

13. The system of claim 12, wherein said preliminary information is received from said one or more parties.

14. The system of claim 13, wherein said one or more computer processors are further programmed to determine whether conflicting preliminary information has been received from said one or more parties.

15. The system of claim 14, wherein said one or more computer processors are further programmed to alert an insurance representative that conflicting preliminary information has been received.

16. The system of claim 14, further wherein if it is determined that there is conflicting preliminary information, said one or more computer processors are further programmed to resolve said conflicting preliminary information with information relating to said accident received from a bystander witness, a police report, or scene locus.

17. The system of claim 12, wherein said preliminary information comprises data relating to at least one of the following:
    traffic light involvement, stop sign involvement, location with respect to the road of claimant's vehicle and/or other vehicles involved, direction of travel of claimant's vehicle with respect to other vehicles involved, and actions of the claimant's vehicle and/or other vehicles involved, including: turning left, turning right, traveling straight, merging, and/or backing up.

18. The system of claim 12, wherein said accident rules relate to at least one of: point of impact factors, line of sight factors, speed factors, evasive action factors, and compliance with traffic regulation factors.

19. The system of claim 12, said one or more computer processors are further programmed to determine a follow-up inquiry to said at least one inquiry, based on said responses received to said at least one inquiry.

20. A non-transitory computer readable medium comprising code, executable by a computer, said code when executed performs the steps of:
    presenting at least one preliminary question about the accident;

receiving responses to the at least one preliminary question;

applying a set of preliminary rules to the responses to the at least one preliminary question to determine accident type;

presenting at least one inquiry based on said accident type;

receiving responses to said at least one inquiry;

determining degree of comparative negligence of one or more parties involved in the accident associated with said responses; and using the determined comparative negligence to adjust a claimant's damages.

\* \* \* \* \*